US012321114B2

(12) United States Patent
Doda et al.

(10) Patent No.: US 12,321,114 B2
(45) Date of Patent: Jun. 3, 2025

(54) FIXING APPARATUS HAVING A NIP AREA, AND IMAGE FORMING APPARATUS

(71) Applicant: CANON KABUSHIKI KAISHA, Tokyo (JP)

(72) Inventors: Kazuhiro Doda, Yokohama (JP); Tsuguhiro Yoshida, Yokohama (JP); Kohei Wakatsu, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/306,322

(22) Filed: Apr. 25, 2023

(65) Prior Publication Data

US 2023/0259057 A1 Aug. 17, 2023

Related U.S. Application Data

(63) Continuation of application No. 17/516,993, filed on Nov. 2, 2021, now Pat. No. 11,669,032, which is a (Continued)

(30) Foreign Application Priority Data

Sep. 6, 2019 (JP) ................................ 2019-162957

(51) Int. Cl.
*G03G 15/20* (2006.01)

(52) U.S. Cl.
CPC ..... *G03G 15/2053* (2013.01); *G03G 15/2064* (2013.01); *G03G 2215/2038* (2013.01)

(58) Field of Classification Search
CPC ........... G03G 15/2017; G03G 15/2053; G03G 2215/2003; G03G 2215/2035
See application file for complete search history.

(56) References Cited

U.S. PATENT DOCUMENTS

| | | | |
|---|---|---|---|
| 8,818,222 | B2 | 8/2014 | Tamaki |
| 9,519,252 | B2 | 12/2016 | Tateishi |

(Continued)

FOREIGN PATENT DOCUMENTS

| | | | |
|---|---|---|---|
| JP | H0588571 | A | 4/1993 |
| JP | 2003307956 | A | 10/2003 |

(Continued)

OTHER PUBLICATIONS

JP 2006178315 English machine translation, Yamamoto, Jul. 6, 2006 (Year: 2006).*

(Continued)

*Primary Examiner* — Thomas S Giampaolo, II
(74) *Attorney, Agent, or Firm* — Venable LLP

(57) ABSTRACT

A fixing apparatus including: a first rotary member; a second rotary member; a nip forming member; and a heater. The nip forming member includes: a first projection portion inside a nip area; and a second projection portion located outside the nip area. The first and second projection portion abut against the inner circumferential surface of the first rotary member. In a direction orthogonal to a nip tangent, a distance between a tip of the second projection portion and the nip tangent is larger than a distance between a tip of the first projection portion and the nip tangent. The second projection portion extends toward the second rotary member without exceeding the nip tangent. A radius of curvature at a tip portion of the second projection portion is smaller than a radius of an inner circumferential circle of the first rotary member.

5 Claims, 20 Drawing Sheets

Related U.S. Application Data continuation of application No. 17/012,613, filed on Sep. 4, 2020, now Pat. No. 11,194,272.

(56) References Cited

U.S. PATENT DOCUMENTS

| | | | | |
|---|---|---|---|---|
| 11,194,272 | B2 * | 12/2021 | Doda | G03G 15/2064 |
| 11,669,032 | B2 * | 6/2023 | Doda | G03G 15/2053<br>399/328 |
| 2015/0331376 | A1 | 11/2015 | Shimmura et al. | |
| 2016/0109834 | A1 | 4/2016 | Kadowaki et al. | |
| 2019/0113868 | A1 | 4/2019 | Akizuki | |

FOREIGN PATENT DOCUMENTS

| | | | |
|---|---|---|---|
| JP | 2006178315 | A | 7/2006 |
| JP | 2007033552 | A | 2/2007 |
| JP | 2008216294 | A | 9/2008 |
| JP | 2011033671 | A | 2/2011 |
| JP | 2012002956 | A | 1/2012 |
| JP | 2013-235181 | A | 11/2013 |
| JP | 2016114621 | A | 6/2016 |
| JP | 2016224310 | A | 12/2016 |
| JP | 2018173624 | A | 11/2018 |
| JP | 2019040193 | A | 3/2019 |

OTHER PUBLICATIONS

Chinese Office Action issued Nov. 21, 2023 in counterpart Chinese Patent Appln. No. 202010916132.4.

Japanese Office Action issued on Jul. 11, 2023 in counterpart Japanese Patent Appln. No. 2019-162957.

Japanese Office Action issued Aug. 6, 2024 in counterpart Japanese Patent Appln. No. 2023-212627.

Japanese Office Action dated Jan. 21, 2025 in counterpart Japanese Patent Appln. No. 2023-212627.

* cited by examiner

| | SEPARATING ABILITY | SHEET STACKABILITY | PARTIAL CROSS SECTION OF NIP FORMING MEMBER (DOWNSTREAM IN CONVEYANCE DIRECTION) |
|---|---|---|---|
| FIRST EMBODIMENT | ○: POSSIBLE | ○: POSSIBLE |  |
| FIRST COMPARATIVE EXAMPLE | ×: IMPOSSIBLE | ○: POSSIBLE |  |
| SECOND COMPARATIVE EXAMPLE | ○: POSSIBLE | ×: IMPOSSIBLE |  |
| THIRD COMPARATIVE EXAMPLE | ×: IMPOSSIBLE | ○: POSSIBLE |  |

| | SEPARATING ABILITY | SHEET STACKABILITY | PARTIAL CROSS SECTION OF NIP FORMING MEMBER 5 (DOWNSTREAM IN CONVEYANCE DIRECTION) |
|---|---|---|---|
| FIRST EMBODIMENT | ○: POSSIBLE | ○: POSSIBLE |  |
| SECOND EMBODIMENT | ○: POSSIBLE | ○: POSSIBLE |  |

FIG. 14A
FIG. 14B
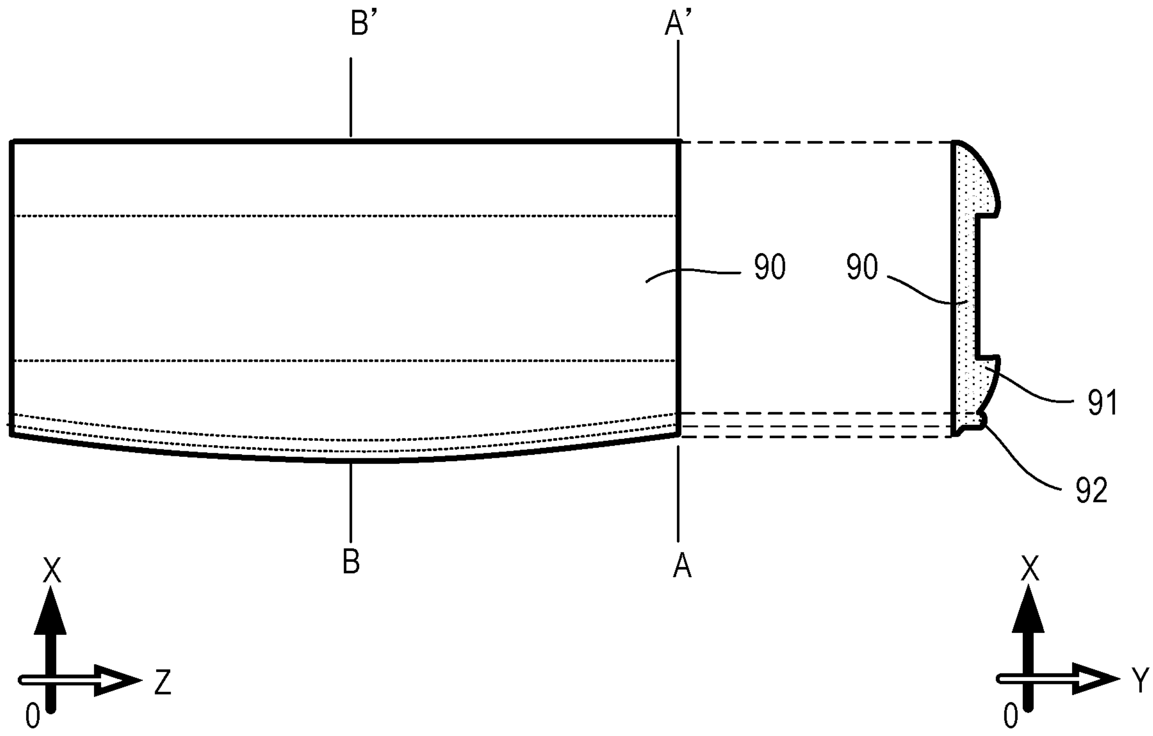
FIG. 14C
FIG. 14D
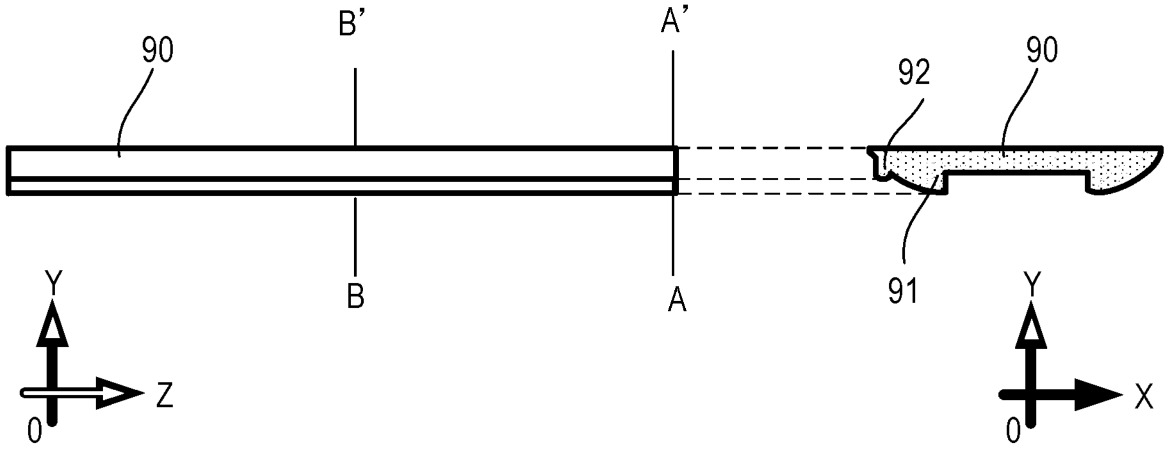

FIXING APPARATUS HAVING A NIP AREA, AND IMAGE FORMING APPARATUS

BACKGROUND OF THE INVENTION

Field of the Invention

The present invention relates to a fixing apparatus and an image forming apparatus, and more particularly, to a fixing apparatus provided in an image forming apparatus, such as a laser printer, a copying machine, or a facsimile, using an electrophotographic recording method.

Description of the Related Art

As a fixing apparatus provided in an image forming apparatus, for example, in Japanese Patent Application Laid-Open No. 2016-114621, there is disclosed a fixing apparatus in which a heat source is arranged inside a fixing film being a heating member and in which a fixing nip portion is formed between a pressure roller being a pressure member and the fixing film. The fixing film of this fixing apparatus has a small heat capacity, and hence the fixing film can be caused to instantly reach a high temperature.

Moreover, for example, in Japanese Patent Application Laid-Open No. 2012-002956, there is disclosed a fixing apparatus including, similarly to Japanese Patent Application Laid-Open No. 2016-114621, a fixing film and a pressure roller, in which a fixing nip forming member which is in contact with an inner circumferential surface of the fixing film is provided at a fixing nip portion. This fixing nip forming member includes a protrusion located on a downstream side in a conveyance direction of a sheet and outside an area of the fixing nip portion (hereinafter referred to as a fixing nip area), thereby improving a separating ability to separate a sheet.

When a sheet passes through the fixing nip area, a toner image formed on the sheet is brought into contact with the fixing film while being heated. There is a tendency that heated toner is increased in stickiness to cause adhesion of an outer surface of the fixing film (hereinafter referred to as a fixing-film outer surface) and a toner image. When an adhesion strength between the fixing-film outer surface and the toner image is excessively high, the sheet may adhere and stick to the fixing-film outer surface, with the result that the sheet cannot be separated from the fixing-film outer surface in some cases. In the fixing apparatus disclosed in Japanese Patent Application Laid-Open No. 2016-114621, the fixing film has an oval shape which is almost a perfect circle, and a radius of curvature of the fixing-film outer surface is substantially the same at any position. Therefore, there is an issue of improving a separating ability.

Moreover, a stackability of a discharged sheet is also demanded for an image forming apparatus. In a fixing configuration in which a heat source is arranged on a front surface side of a sheet, a front surface of a sheet reaches a higher temperature than a back surface. In such a case, the sheet is more liable to curl into a tubular shape with the back surface side of the sheet located on an inner side. When the sheet strongly curls, it is impossible to stack the sheet on a discharge portion in some cases. In the fixing apparatus disclosed in Japanese Patent Application Laid-Open No. 2012-002956, the nip forming member includes the protrusion located on the downstream side in the conveyance direction and on the outer side of the fixing nip area, and the protrusion protrudes significantly toward the pressure roller. The sheet is discharged along a rotation direction of the pressure roller. Thus, the direction in which the sheet curls due to heating and the direction of a curve given by the discharge direction are the same. Therefore, the sheet may curl into the tubular shape under high-temperature and high-humidity conditions.

SUMMARY OF THE INVENTION

According to an embodiment of the present invention, there is provided a fixing apparatus comprising: a first rotary member which is rotatable; a second rotary member configured to contact the first rotary member; a nip forming member, which is located on an inner circumferential side of the first rotary member, and is configured to support the first rotary member to form a nip area being a contact area between the first rotary member and the second rotary member; and a heater held by the nip forming member, wherein the fixing apparatus is configured to heat a toner image, which is borne on a recording material, in the nip area, wherein the nip forming member includes: a first projection portion, which is located on an inner side of the nip area and in a vicinity of an end portion on a downstream side in a conveyance direction of the recording material, and abuts against an inner circumferential surface of the first rotary member; and a second projection portion, which is located on an outer side of the nip area and on the downstream side in the conveyance direction, and abuts against the inner circumferential surface of the first rotary member, wherein, in an orthogonal direction with respect to a nip tangent passing through a contact surface between the first rotary member and the second rotary member in the nip area in which the heater is in contact with the inner circumferential surface of the first rotary member and extending parallel to the contact surface, a distance between a tip of the second projection portion and the nip tangent is larger than a distance between a tip of the first projection portion and the nip tangent, wherein the second projection portion extends toward the second rotary member in the orthogonal direction without exceeding the nip tangent, and wherein a radius of curvature at a tip portion of the second projection portion is smaller than a radius of an inner circumferential circle of the first rotary member.

Further features of the present invention will become apparent from the following description of exemplary embodiments with reference to the attached drawings.

BRIEF DESCRIPTION OF THE DRAWINGS

FIG. 14A, FIG. 14B, FIG. 14C, and FIG. 14D are schematic views of a nip forming member according to the third embodiment.

DESCRIPTION OF THE EMBODIMENTS

Now, embodiments of the present invention are described in detail with reference to the accompanying drawings.

First Embodiment

[Fixing Apparatus]

Figure 1:
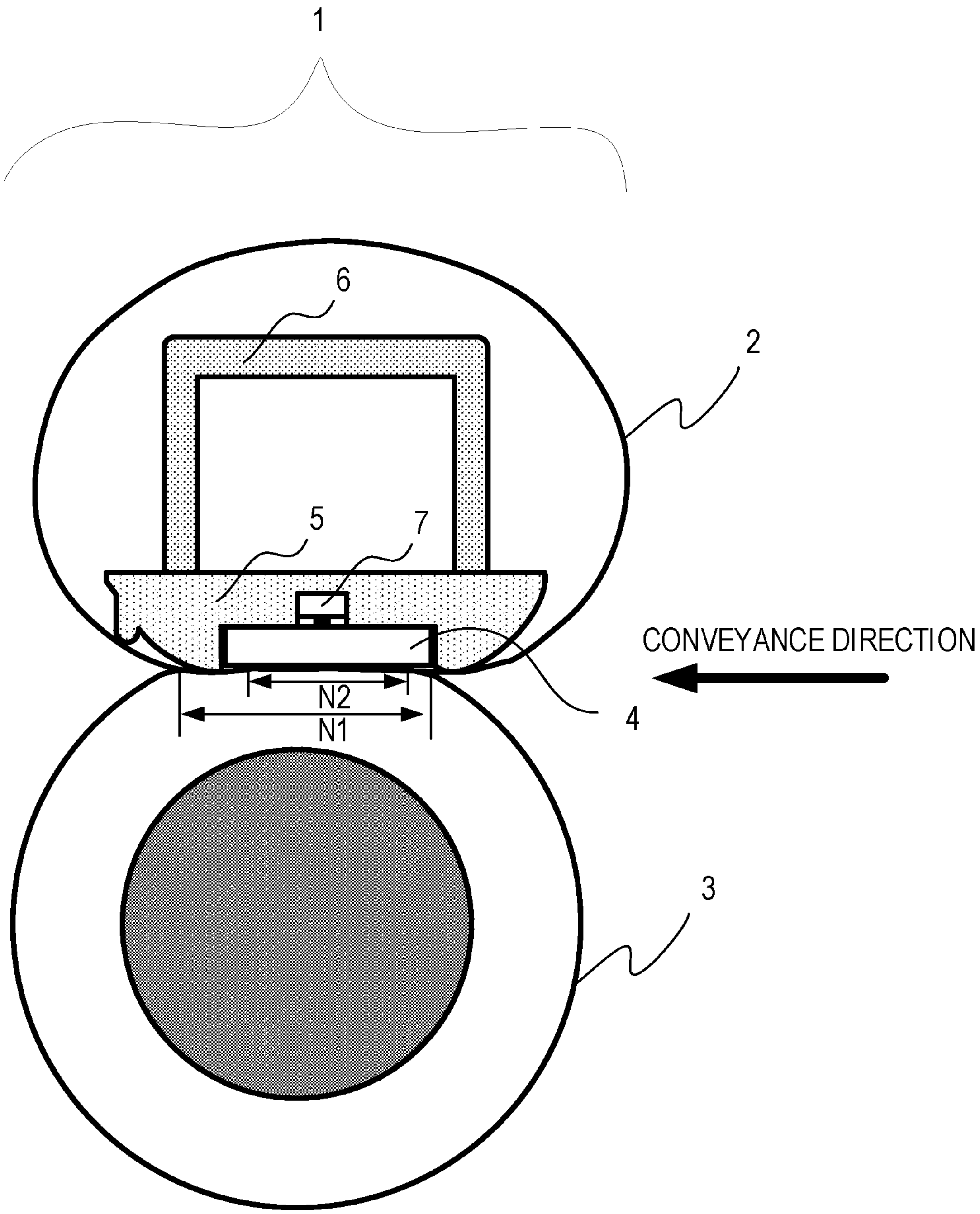
FIG. 1 is a sectional view of a fixing apparatus according to a first embodiment.

The present disclosure relates to a fixing apparatus 1 provided in an image forming apparatus 30 (FIG. 7), such as a laser printer, a copying machine, or a facsimile, using an electrophotographic recording method. FIG. 1 is a sectional view of the fixing apparatus 1 according to a first embodiment. The fixing apparatus 1 includes a fixing film 2, a pressure roller 3, a heater 4, and a nip forming member 5. The fixing film 2 is a first rotary member which has a cylindrical shape (or a tubular shape) and is rotatable. The pressure roller 3 is a second rotary member forming a fixing nip portion with the fixing film 2. The nip forming member 5 is configured to hold the heater 4. The nip forming member 5 is arranged on an inner circumferential side of the fixing film 2 and is configured to support the fixing film 2 at the fixing nip portion. The fixing apparatus 1 further includes a stay 6 configured to keep the strength in a longitudinal direction of the fixing apparatus 1. The longitudinal direction of the fixing apparatus 1 is also a substantially orthogonal direction with respect to a conveyance direction of a sheet being a recording material. The fixing nip portion is formed in a nip area, which is formed by the nip forming member 5 and is a contact area between the fixing film 2 and the pressure roller 3.

The fixing film 2 is formed of a polyimide base material, a silicone rubber layer, and a PFA mold release layer. The polyimide base material has a film thickness of 50 μm. The silicone rubber layer has a film thickness of 200 μm and is formed on the polyimide base material. The PFA mold release layer has a film thickness of 20 μm and is formed on the silicone rubber layer. The pressure roller 3 is formed of an SUM metal core, a silicone rubber elastic layer, and a PFA mold release layer. The SUM metal core has an outer diameter of 13 mm. The silicone rubber elastic layer has a film thickness of 3.5 mm and is formed on the SUM metal core. The PFA mold release layer has a film thickness of 40 μm and is formed on the silicone rubber elastic layer. The pressure roller 3 is rotated by a drive source (not shown), and the fixing film 2 urged by the pressure roller 3 follows the drive of the pressure roller 3 to rotate.

The heater 4 is held by the nip forming member 5, and an inner circumferential surface of the fixing film 2 and a surface of the heater 4 are in contact with each other. Both ends of the stay 6 are pressurized by means that is not shown, and the pressurizing force is received by the pressure roller 3 via the nip forming member 5 and the fixing film 2. As a result, the fixing nip portion at which the fixing film 2 and the pressure roller 3 are in pressure contact with each other is formed. The nip forming member 5 is required to have stiffness, a heat resistance, and a heat insulating property, and is formed of a liquid crystal polymer.

The heater 4 is formed of a ceramic substrate and a heater. The ceramic substrate has a plate shape and is made of, for example, alumina. The heater is provided on the ceramic substrate and is made mainly of silver and palladium. The ceramic substrate has a thickness t=1 mm, a width W=6.3 mm, and a length l=280 mm. The heater provided on the ceramic substrate generates heat. On a back surface of the heater 4, there are arranged a thermistor 7 being a temperature detecting unit and a thermo switch (not shown) being a safety element in contact with each other. The thermistor 7 is a thermistor of a chip resistance type. A chip resistance of the thermistor 7 is detected, and a result of the detection by the thermistor 7 is used for temperature control of the heater 4. As materials of the ceramic substrate, for example, alumina ($Al_2O_3$), aluminum nitride (AlN), zirconia ($ZrO_2$), and silicon carbide (SiC) are widely known. Among those materials, alumina ($Al_2O_3$) is low in price and can industrially be obtained with ease. Moreover, a metal which is excellent in strength may be used for the substrate, and stainless steel (SUS) is excellent in price and strength and thus is suitably used for a metal substrate. In a case in which any of a ceramic substrate and a metal substrate is used as the substrate, and the substrate has conductivity, it is required that the substrate be used with an insulating layer provided thereto.

The thermistor 7 is capable of detecting also an excessive temperature rise. The thermo switch is a bimetal thermo switch, and the heater 4 and the thermo switch are electrically connected to each other. When the thermo switch detects an excessive temperature rise on the back surface of the heater 4, a bimetal provided inside the thermo switch operates, thereby being capable of interrupting power supplied to the heater 4.

[Nip Forming Member]

Figure 2A:
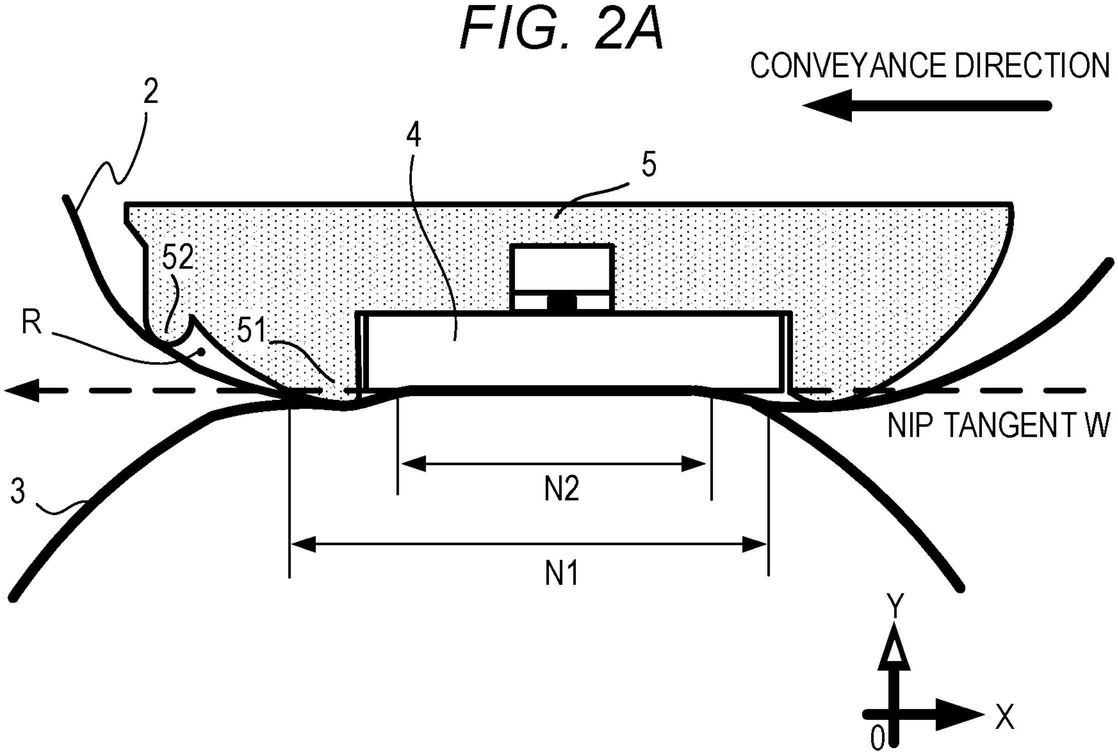
FIG. 2A is a sectional view of a nip forming member of the first embodiment.

FIG. 2A is a sectional view of the nip forming member 5 of the first embodiment. An area in which the fixing film 2 and the pressure roller 3 are in contact with each other is referred to as a nip area N1, and an area in which the fixing film 2 and the heater 4 are in contact with each other is referred to as a nip area N2. A tangent of the nip area N2 is referred to as a nip tangent W. A direction parallel to the nip tangent W is referred to as an X direction (rightward direction in the drawing of FIG. 2A (the direction opposite to the conveyance direction) corresponds to a plus side), and a direction perpendicular to the nip tangent W in the drawing of FIG. 2A is referred to as a Y direction (upward direction in the drawing of FIG. 2A corresponds to a plus side). The nip tangent W is a straight line which passes through a contact surface between the fixing film 2 and the pressure roller 3 in the nip area N2, in which the heater 4 is in contact with the inner circumferential surface of the fixing film 2, and extends parallel to the contact surface.

The nip forming member 5 includes a first projection portion 51 and a second projection portion 52. The first projection portion 51 is a projection portion which is located more on a downstream side in the conveyance direction of a sheet than the heater 4 and is in contact with the pressure roller 3 across the fixing film 2. The first projection portion 51 is located in the nip area N1 and in the vicinity of an end portion of the nip area N1 on the downstream side in the conveyance direction. The first projection portion 51 extends (projects) toward the pressure roller 3 (minus side in the Y-axis direction) in the substantially orthogonal direction with respect to the nip tangent W. The first projection portion 51 presses the inner circumferential surface of the fixing film 2, thereby changing a radius of curvature of an outer surface of the fixing film 2 at the pressed part. The first projection portion 51 is arranged at a position corresponding to a timing immediately before a sheet is discharged from the fixing nip portion, and has a function to apply high pressure (peak pressure) to a sheet to cause a toner image to adhere to the sheet. The first projection portion 51 presses the inner circumferential surface of the fixing film 2 against the pressure roller 3 in the vicinity of an end portion of the fixing nip portion on the downstream side in the conveyance direction.

The second projection portion 52 is a projection portion which is located more on the downstream side in the conveyance direction than the heater 4 and the first projection portion 51 and is in abutment against the inner circumferential surface of the fixing film 2 but does not receive pressure from the pressure roller 3, that is, is not in contact with the pressure roller 3 across the fixing film 2. The second projection portion 52 is located on an outer side of the nip area N1 and on the downstream side in the conveyance direction. The second projection portion 52 extends toward the pressure roller 3 (minus side in the Y-axis direction) in the substantially orthogonal direction with respect to the nip tangent W. The second projection portion 52 is not in contact with the pressure roller 3 across the fixing film 2. The second projection portion 52 presses the inner circumferential surface of the fixing film 2 at a position corresponding to a timing immediately after a sheet is discharged from the fixing nip portion to change a curvature of the fixing film 2, thereby being capable of reducing a radius of curvature of the outer surface of the fixing film 2. As a result, the second projection portion 52 has a function to separate a sheet from the fixing film 2. Between the first projection portion 51 and the second projection portion 52, there is provided a space R in which the inner circumferential surface of the fixing film 2 and the nip forming member 5 are not in abutment against each other and in which the outer surface of the fixing film 2 and the pressure roller 3 are not in contact with each other, thereby bringing the fixing film 2 into contact with the second projection portion 52 such that the fixing film 2 is wound around the second projection portion 52. As a result, the fixing film 2 is capable of more reliably being in contact with the second projection portion 52, thereby being capable of stably giving a separating ability to separate a sheet from the fixing film 2. Here, the nip area N1 has a length of about 8 mm in the conveyance direction, and the nip area N2 has a length of about 6 mm in the conveyance direction.

Figure 2B:
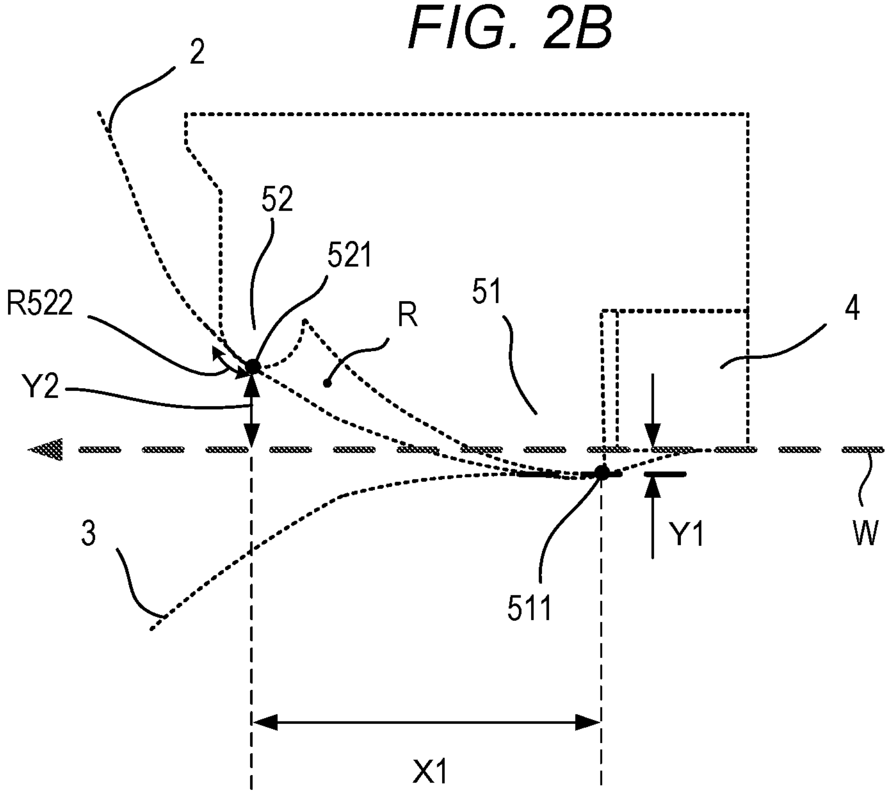
FIG. 2B is a partial enlarged view of FIG. 2A.

FIG. 2B is a partial enlarged view of FIG. 2A including the first projection portion 51 and the second projection portion 52 on the downstream side of the nip forming member 5 in the conveyance direction in the first embodiment. In the first projection portion 51, a point which is located in the nip area N1 and protrudes most toward the pressure roller 3 side (minus side in the Y-axis direction) is referred to as a top point 511 of the first projection portion 51. In the second projection portion 52, a point which protrudes most toward the pressure roller 3 side (minus side in the Y-axis direction) is referred to as a top point 521 of the second projection portion 52.

The first projection portion 51 is located more on an upstream side in the conveyance direction (plus side in the X direction) than the second projection portion 52, and a distance X1 between the top point 511 of the first projection portion 51 and the top point 521 of the second projection portion 52 in the X direction is, for example, 3 mm. The first projection portion 51 enters (the minus side in the Y direction) over the nip tangent W, and an entry amount Y1 of the top point 511 of the first projection portion 51 with respect to the nip tangent W is, for example, 0.2 mm. Here, the entry amount Y1 of the top point 511 of the first projection portion 51 with respect to the nip tangent W is a distance between the top point 511 of the first projection portion 51 and the nip tangent W in the substantially orthogonal direction with respect to the nip tangent W. Meanwhile, the second projection portion 52 is arranged with a gap with respect to the nip tangent W without reaching the nip tangent W, and a distance (minimum retreat amount) Y2 from the top point 521 of the second projection portion 52 to the nip tangent W is, for example, 0.8 mm. Here, the distance (minimum retreat amount) Y2 from the top point 521 of the second projection portion 52 to the nip tangent W is a distance between the top point 521 of the second projection portion 52 and the nip tangent W in the substantially orthogonal direction with respect to the nip tangent W.

A tip part of the second projection portion 52 has a semicircular sectional shape with a radius of 4 mm in the substantially orthogonal direction with respect to a longitudinal direction, and a radius of curvature R522 of an area that is in abutment against the inner circumferential surface of the fixing film 2 is 4 mm. The fixing film 2 has a substantially cylindrical shape in which a radius of an inner circumferential circle is 9 mm, and a radius of curvature of the outer surface is basically about 9 mm. The second projection portion 52 having a small radius of curvature is brought into press contact with the inner circumferential surface of the fixing film 2 to reduce the radius of curvature of the surface of the fixing film 2 at the pressed part, thereby being capable of improving the separating ability to separate a sheet from the fixing film 2. It is preferred that the radius of curvature of the second projection portion 52 be smaller than the radius of the inner circumferential circle of the fixing film 2. Here, the radius of the inner circumferential circle of the fixing film 2 is a radius of the largest circle inscribed in a substantially circular shape formed by the fixing film 2 in a cross section which is orthogonal to a direction in which a cylinder of the fixing film 2 having a cylindrical shape extends.

Figure 3A:
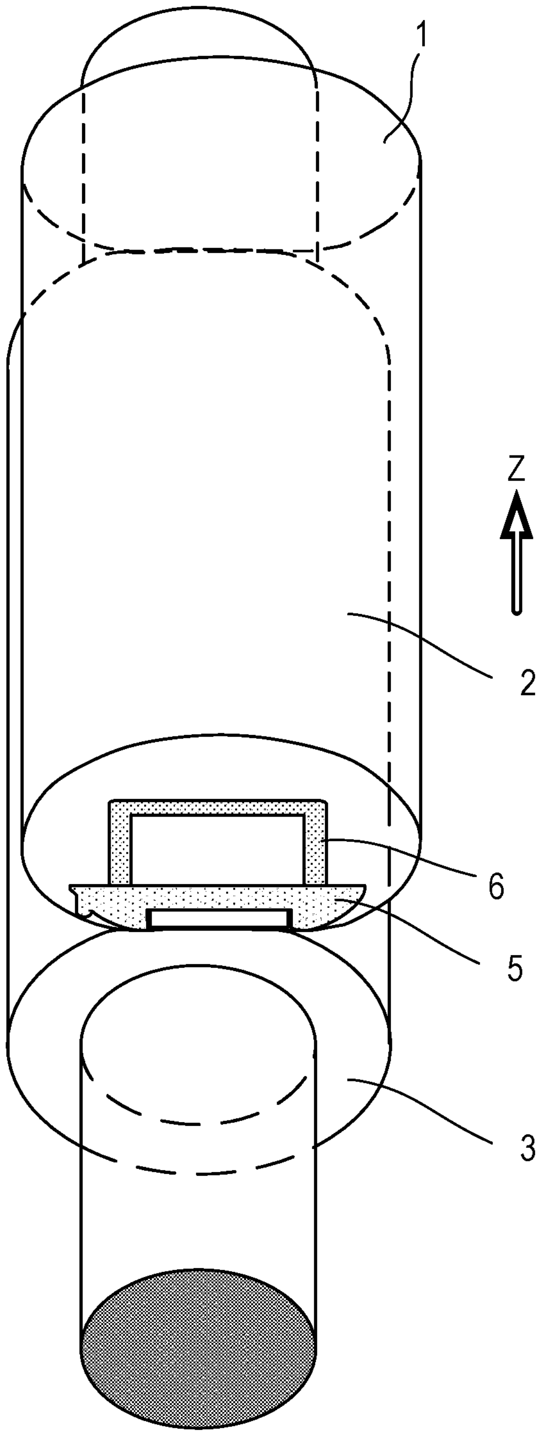
FIG. 3A is a perspective view of the fixing apparatus according to the first embodiment.
Figure 3B:
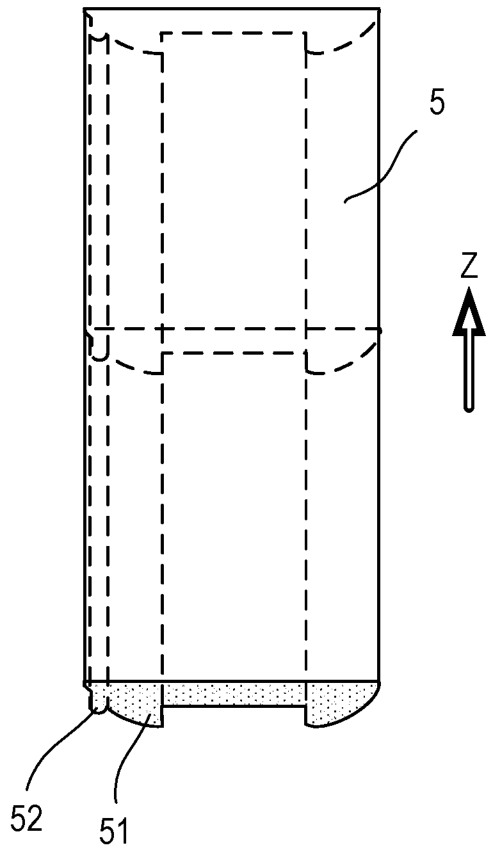
FIG. 3B is a perspective view of the nip forming member of the first embodiment.

FIG. 3A is a perspective view of the fixing apparatus 1 according to the first embodiment. A direction parallel to a core shaft of the pressure roller 3 is referred to as a Z direction (upward direction in the drawing of FIG. 3B corresponds to a plus side). FIG. 3B is a perspective view of the nip forming member 5 of the first embodiment. Each of the first projection portion 51 and the second projection portion 52 is continuously formed in such a manner as to extend in the Z direction.

As described above, the second projection portion 52 arranged outside the nip area N1 is in contact with the circumferential surface in the fixing film 2 so that the surface of the fixing film 2 is curved, thereby being capable of reducing the radius of curvature of the surface of the fixing film 2. As a result, a sheet can easily be separated from the fixing film 2.

Moreover, the second projection portion 52 is arranged farther apart from the nip tangent W than the first projection portion 51 in the direction opposite to the pressure roller 3 (plus side in the Y-axis direction). Accordingly, a sheet discharged from the nip area N1 is discharged in an inclined state toward the direction opposite to the pressure roller 3 (plus side in the Y-axis direction). A curve is given to the sheet in a direction opposite to a direction of curling of the sheet through heating and is discharged. As a result, the curling of the sheet is significantly alleviated, thereby being capable of improving the stackability of a sheet.

Effect

For the purpose of checking the effect of the first embodiment, through comparison with a first comparative example, a second comparative example, and a third comparative example including nip forming members different from the nip forming member 5 in shape, (i) a separating ability to separate a sheet and (ii) a stackability of a discharged sheet were checked.

First Comparative Example

Figure 4A:
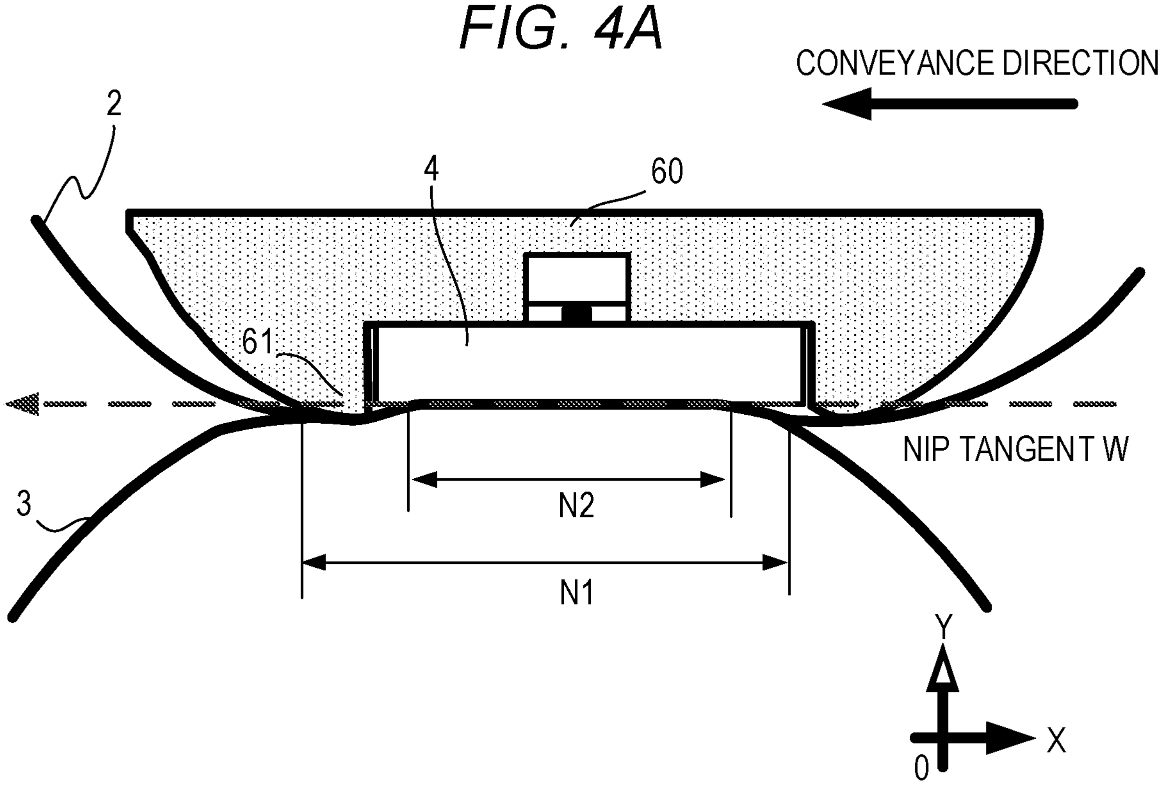
FIG. 4A is a sectional view of a nip forming member of a first comparative example.
Figure 4B:
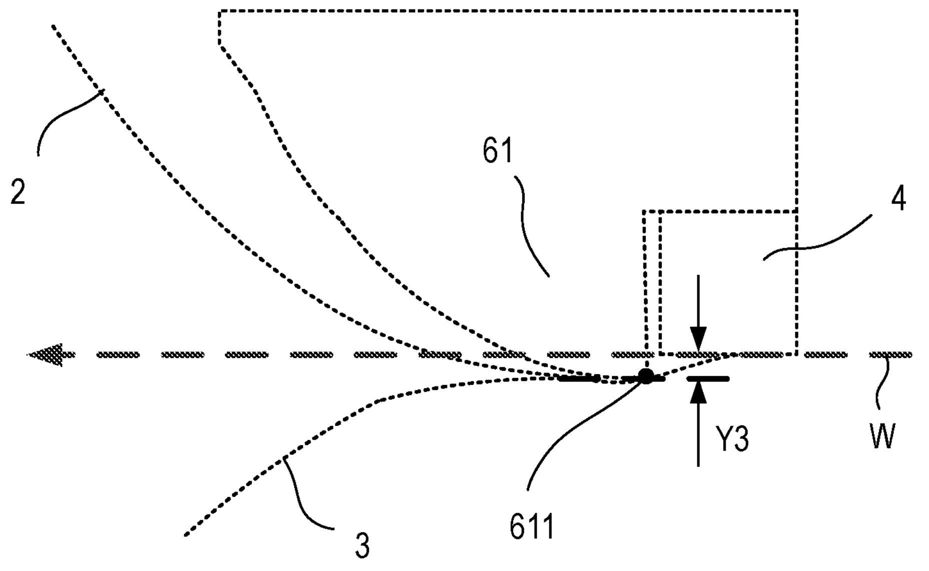
FIG. 4B is a partial enlarged view of FIG. 4A.

FIG. 4A is a sectional view of a nip forming member 60 of the first comparative example. FIG. 4B is a partial enlarged view of FIG. 4A including a first projection portion 61 provided on the downstream side in the conveyance direction. In FIG. 4A, the nip forming member 60 includes the first projection portion 61. In the first comparative example, the nip areas N1 and N2 are the same as those of the first embodiment. The nip area N1 has a length of about 8 mm in the conveyance direction, and the nip area N2 has a length of about 6 mm in the conveyance direction. In FIG. 4B, a top point 611 of the first projection portion 61 enters over the nip tangent W, and an entry amount Y3 is 0.2 mm. Unlike the nip forming member 5 of the first embodiment, the nip forming member 60 does not include a second projection portion.

Second Comparative Example

Figure 5A:
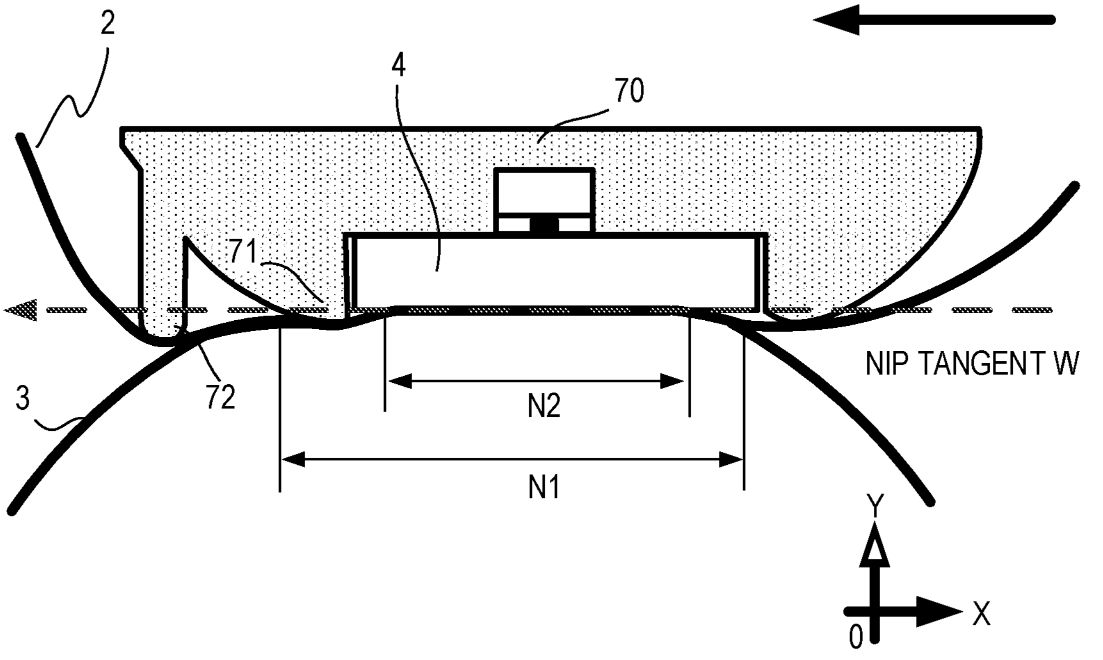
FIG. 5A is a sectional view of a nip forming member of a second comparative example.
Figure 5B:
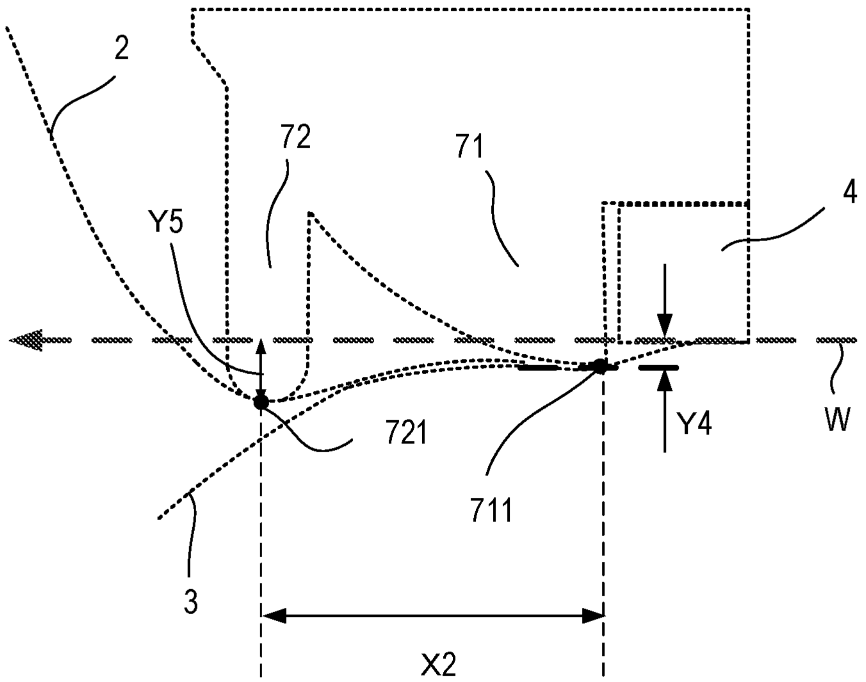
FIG. 5B is a partial enlarged view of FIG. 5A.

FIG. 5A is a sectional view of a nip forming member 70 of the second comparative example. FIG. 5B is a partial enlarged view of FIG. 5A including a first projection portion 71 and a second projection portion 72 provided on the downstream side in the conveyance direction. In the second comparative example, the nip areas N1 and N2 are the same as those of the first embodiment. The nip area N1 has a length of about 8 mm in the conveyance direction, and the nip area N2 has a length of about 6 mm in the conveyance direction. In FIG. 5B, an entry amount Y4 of a top point 711 of the first projection portion 71 is 0.2 mm. The second projection portion 72 is arranged more on the downstream side in the conveyance direction than the first projection portion 71, and a distance X2 between the top point 711 of the first projection portion 71 and a top point 721 of the second projection portion 72 is 3 mm. The top point 721 of the second projection portion 72 crosses over the nip tangent W to enter the minus side in the Y direction, and an entry amount Y5 is 0.6 mm. That is, the second comparative example is different from the first embodiment in that the second projection portion 72 projects toward the pressure roller 3 side more than the first projection portion 71 and the surface of the heater 4.

Third Comparative Example

Figure 6A:
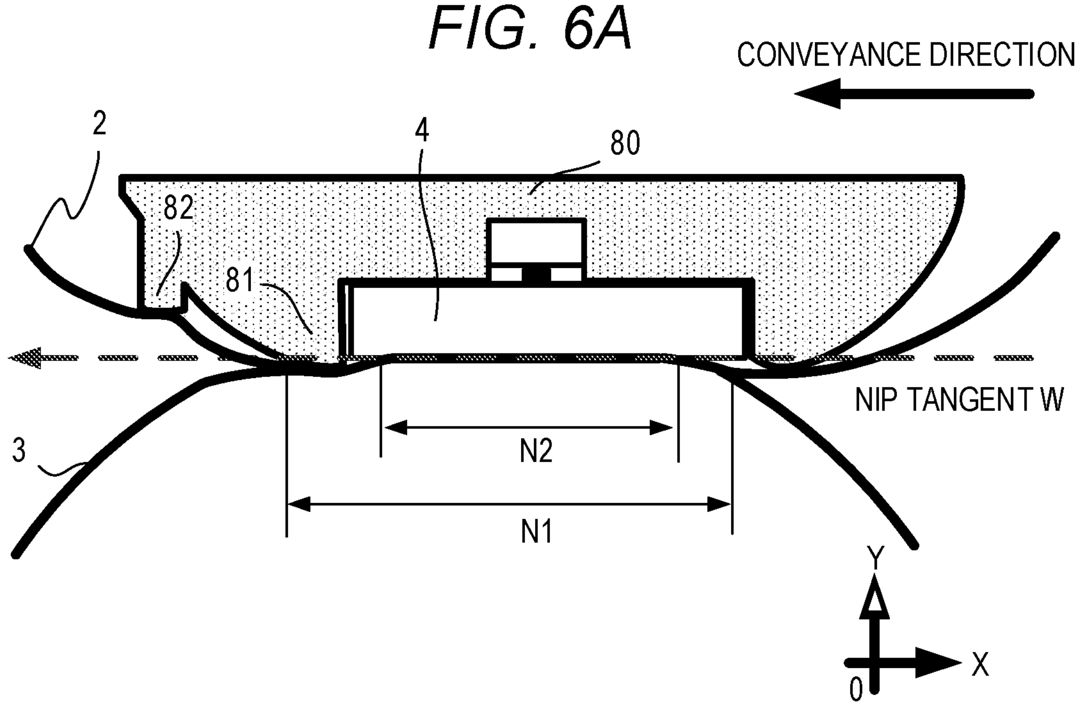
FIG. 6A is a sectional view of a nip forming member of a third comparative example.
Figure 6B:
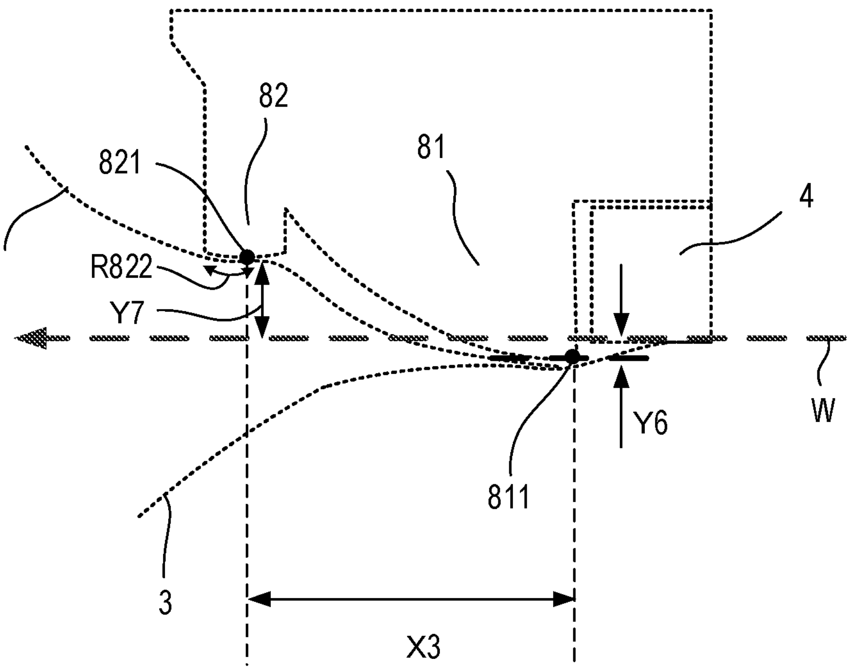
FIG. 6B is a partial enlarged view of FIG. 6A.

FIG. 6A is a sectional view of a nip forming member 80 of the third comparative example. FIG. 6B is a partial enlarged view of FIG. 6A including a first projection portion 81 and a second projection portion 82 provided on the downstream side in the conveyance direction. In the third comparative example, the nip areas N1 and N2 are the same as those of the first embodiment. The nip area N1 has a length of about 8 mm in the conveyance direction, and the nip area N2 has a length of about 6 mm in the conveyance direction. In FIG. 6B, an entry amount Y6 of a top point 811 of the first projection portion 81 is 0.2 mm. A minimum retreat amount of a top point 821 of the second projection portion 82 is also the same as that of the first embodiment, and a minimum retreat amount Y7 is 0.8 mm. The second projection portion 82 is arranged more on the downstream side in the conveyance direction than the first projection portion 81, and a distance X3 between the first projection portion 81 and the second projection portion 82 is 3 mm. The third comparative example is different from the first embodiment in that a radius of curvature R822 at a tip part of the second projection portion 82 is 10 mm and is larger than the radius of the inner circumference of the fixing film 2, which is 9 mm.

(i) Separating Ability to Separate Sheet

Comparison of a separating ability to separate a sheet was conducted for the configurations of the first embodiment and the first to third comparative examples. A sheet oriented in such a manner as to bring a toner image into contact with the fixing film 2 was allowed to enter the fixing nip portion formed by the fixing film 2 and the pressure roller 3. Then, tests were conducted to check whether a sheet discharged from the fixing nip portion was separated from the fixing film 2.

Test conditions are described below. A test room was set to a temperature of 30° C. and a humidity of 80%. An A4 sheet of CS-060F manufactured by Canon Inc. having a basis weight of 60 $g/m^2$ and a thickness of 81 μm was used as the sheet. Power input to the fixing apparatus 1 was controlled such that the thermistor 7 provided in the fixing apparatus 1 keeps 220° C. The pressure roller 3 was rotated by a drive source (not shown), thereby conveying the sheet at 200 mm/sec. There were given leading and trailing edge margins of 5 mm and right and left margins of 5 mm. Toner of magenta with a density of 0.5 $mg/cm^2$ and toner of cyan with a density of 0.5 $mg/cm^2$ were superimposed and formed on the sheet. The leading and trailing edges are an edge on the downstream side (leading edge) in the conveyance direction of a sheet and an edge on the upstream side (trailing edge).

Check results regarding the separating ability to separate a sheet are described. In the first embodiment and the second comparative example, it was possible to separate the sheet. Meanwhile, in the first comparative example and the third comparative example, it was impossible to separate the sheet. Consideration is given to the test results with regard to the separating ability. In the first embodiment and the second comparative example, the second projection portion 52, 72 having a small radius of curvature was provided and was brought into press contact with the inner circumferential surface of the fixing film 2. The radius of curvature of the surface of the fixing film 2 could be significantly reduced at the pressed part. As a result, it was possible to separate the sheet in that area. Meanwhile, in the first comparative example, the second projection portion was not provided, and the radius of curvature of the surface of the fixing film 2 could not be reduced. As a result, it was impossible to separate the sheet. The second projection portion 82 of the third comparative example was pressed against and brought into contact with the inner circumferential surface of the fixing film 2. However, the radius of curvature of the second projection portion was 10 mm, which was larger than the radius of the inner circumference of the fixing film 2, and hence the radius of curvature of the surface of the fixing film 2 could not be reduced. As a result, the sheet could not be separated from the fixing film 2. Based on the test results described above, it was found that, when the second projection portion arranged on the outer side of the nip area is provided, and the radius of curvature of the second projection portion is set to be smaller than the radius of the inner circumference of the fixing film 2, it is possible to separate the sheet.

(ii) Stackability of Sheet Discharged from Fixing Apparatus 1

(As to Image Forming Apparatus)

Figure 7:
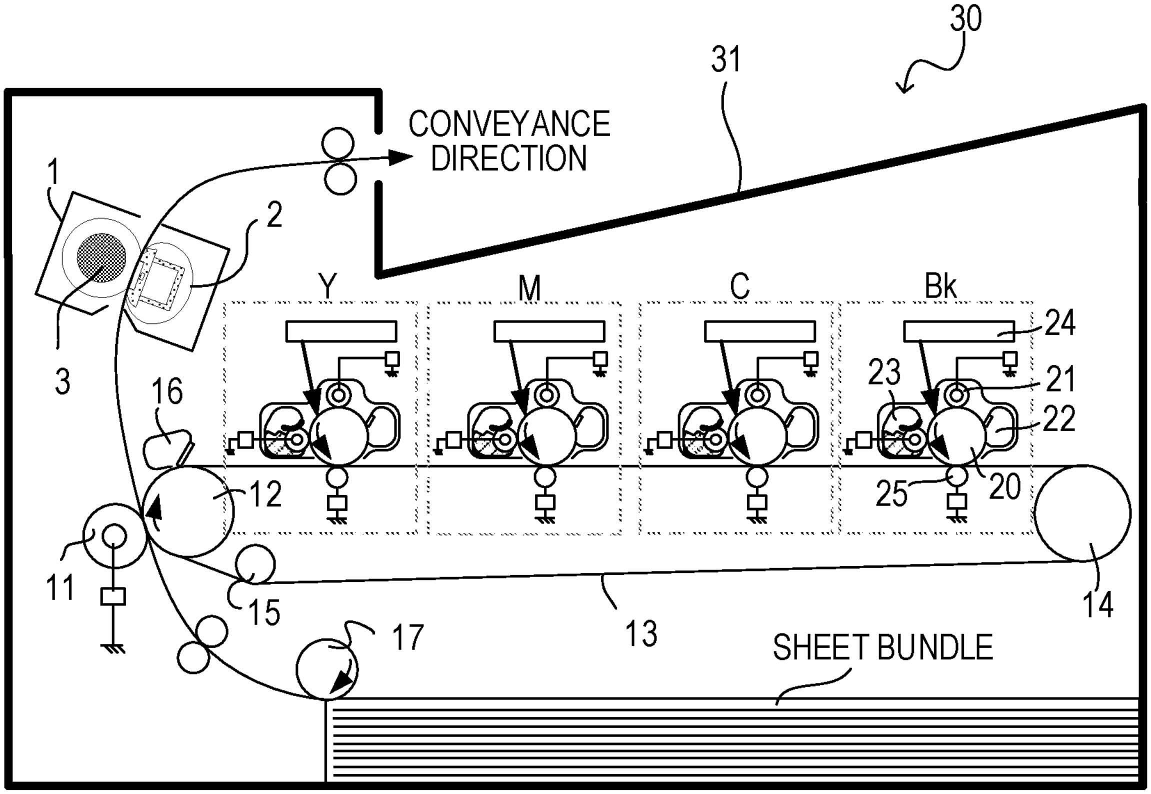
FIG. 7 is a sectional view of an image forming apparatus according to first to fourth embodiments.

With use of the image forming apparatus 30 illustrated in FIG. 7, tests were conducted for the configurations of the first embodiment and the first to third comparative examples to check whether it is possible to stack the discharged sheet. The image forming apparatus 30 is a color laser beam printer of an in-line type. Now, a configuration of the image forming apparatus 30 is described. The image forming apparatus 30 includes four stations for yellow (Y), magenta (M), cyan (C), and black (Bk). The stations have the same configuration. Thus, in FIG. 7, reference symbols are given only to the station for black (Bk), and reference symbols for other stations are omitted. Each station includes a photosensitive drum 20, a charging roller 21, a cleaning unit 22, and a developing unit 23. The photosensitive drum 20 is an image bearing member. The charging roller 21 is configured to charge the photosensitive drum 20. The cleaning unit 22 is configured to collect toner on the photosensitive drum 20. The developing unit 23 is formed of a developing roller, toner, and a developing blade. Those are integrated into a process cartridge which is detachably attached to the image forming apparatus 30. The exposure device 24 is a scanner unit configured to scan a laser beam with use of a polygon mirror, and is configured to irradiate the photosensitive drum 20 with a scanning beam that is modulated based on an image signal. The photosensitive drum 20 and a primary transfer roller 25 are arranged opposed to each other across an intermediate transfer belt 13. The intermediate transfer belt 13 is stretched around a tension roller 14, a secondary transfer opposing roller 12, and an auxiliary roller 15, and a secondary transfer roller 11 is arranged opposed to the secondary transfer opposing roller 12. An intermediate transfer belt cleaning unit 16 is configured to remove toner on the intermediate transfer belt 13. The fixing apparatus 1 is arranged more on the downstream side in the conveyance direction than the secondary transfer roller 11.

Next, an image forming process is described. An electrostatic latent image is formed on the photosensitive drum 20 by the exposure device 24. The photosensitive drum 20 is in contact with the developing roller holding toner on a surface thereof, and a toner image is developed on the photosensitive drum 20. A voltage is applied to the primary transfer roller 25, and the toner image on the photosensitive drum 20 is transferred to the intermediate transfer belt 13. A voltage is applied to the secondary transfer roller 11, and the toner image on the intermediate transfer belt 13 is transferred to the sheet conveyed to the secondary transfer roller 11. A member which contributes to formation of the unfixed toner image on the sheet before the sheet reaches the fixing apparatus 1 functions as an image forming unit. The fixing apparatus 1 applies heat to fix the toner image on the sheet. The sheet is stacked on a discharge portion 31 of the image forming apparatus 30.

Test conditions are described below. A test room was set to a temperature of 30° C. and a humidity of 80%. An A4 sheet of CS-060F manufactured by Canon Inc. having a basis weight of 60 $g/m^2$ and a thickness of 81 μm was used as the sheet. Power input to the fixing apparatus 1 was controlled such that the thermistor 7 provided in the fixing apparatus 1 keeps 220° C. The image forming apparatus 30 has a process speed of 200 mm/sec. Ten sheets were successively allowed to pass without forming a toner image on the sheets, to thereby check a degree of curling of the sheet and whether it is possible to stack sheets on the discharge portion 31.

Figure 8A:
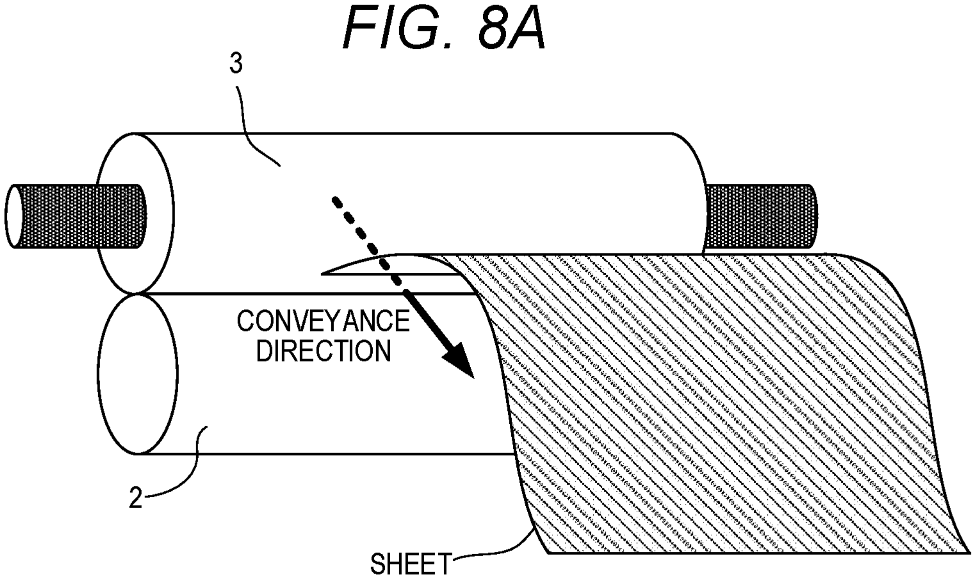
FIG. 8A and FIG. 8B are explanatory views for illustrating a sheet stackability in the first embodiment.
Figure 8B:
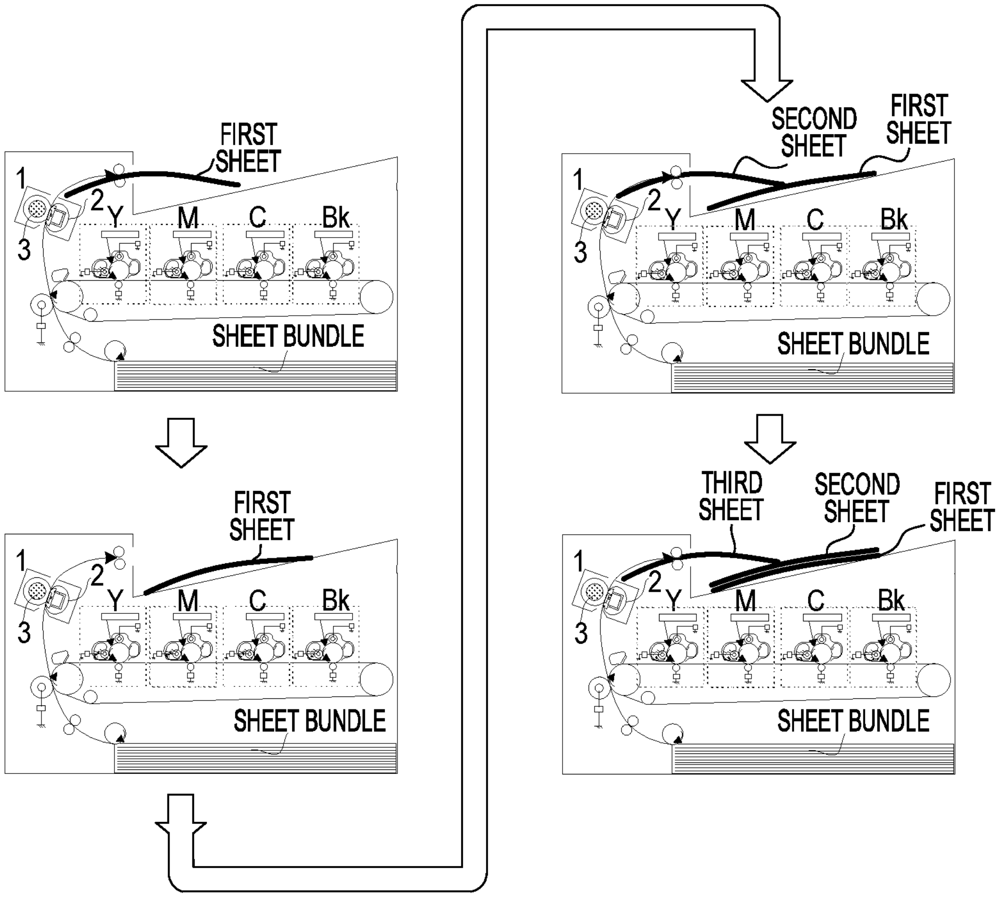

FIG. 8A and FIG. 8B are explanatory views for illustrating the stackability of a sheet in the first embodiment. FIG. 8A is a view for illustrating a state of a sheet discharged from the fixing apparatus 1. In FIG. 8A, the sheet was discharged from the fixing apparatus 1 while being gently curved with respect to the conveyance direction such that a front surface (surface on a front side) of the sheet is located on an inner side. In FIG. 8A, the hutched surface is a back surface of the sheet. FIG. 8B is an illustration of a state in which first to third sheets which are successively discharged are stacked on the discharge portion 31. The sheets were neatly stacked on the discharge portion 31 of the image forming apparatus 30. The sheets were stacked without difficulty not only in the first embodiment but also in the first comparative example and the third comparative example.

Figure 9A:
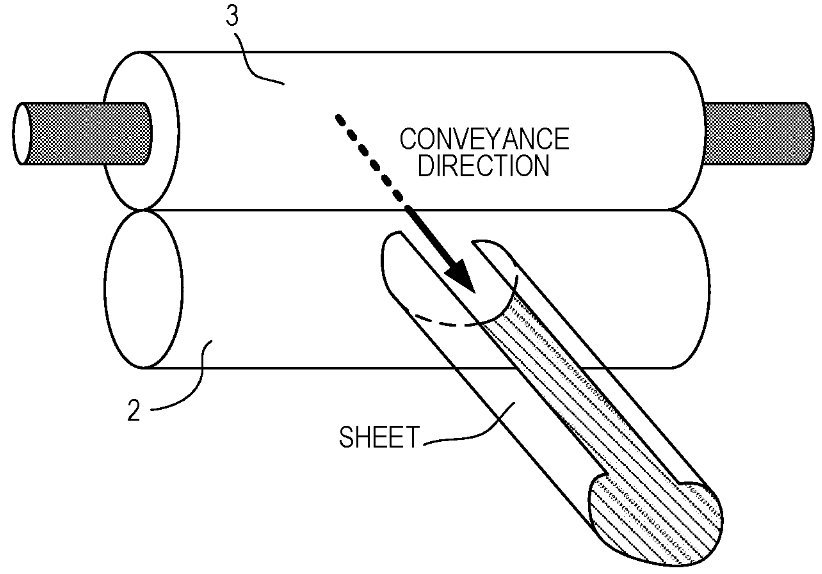
FIG. 9A and FIG. 9B are explanatory views for illustrating a sheet stackability in the second comparative example.
Figure 9B:
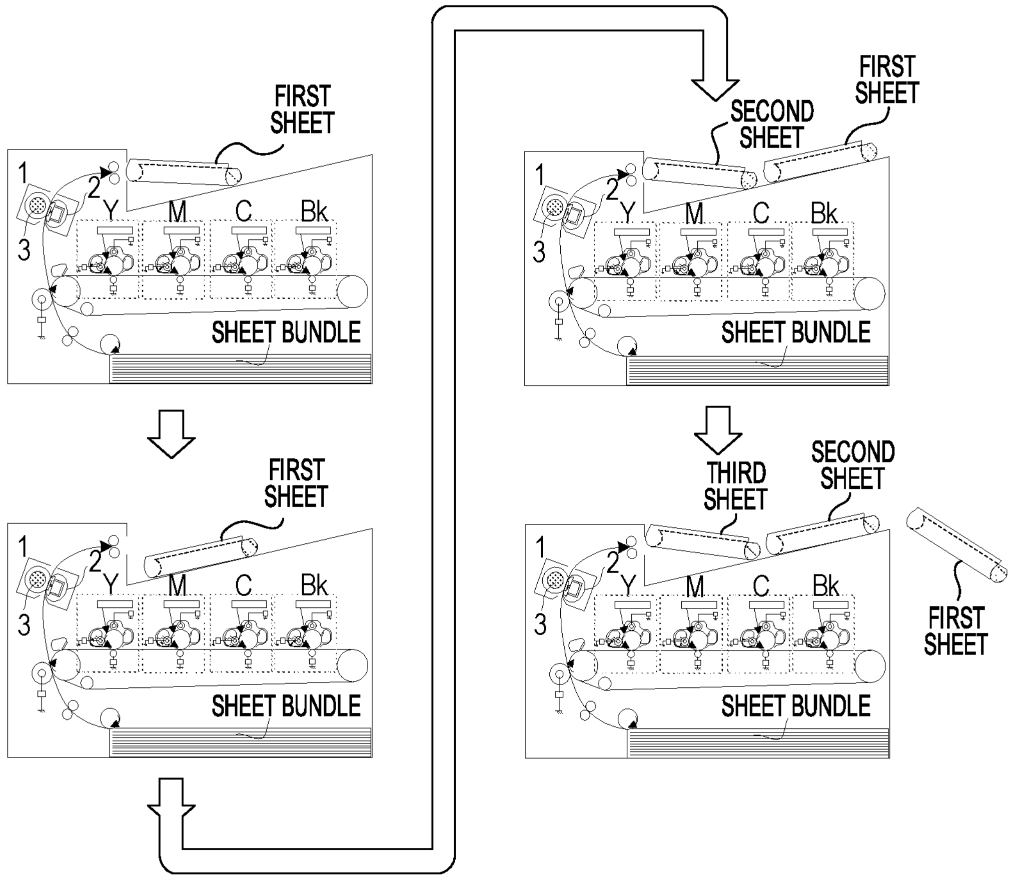

Next, explanatory views for illustrating a stackability of a sheet in the second comparative example are shown in FIG. 9A and FIG. 9B. FIG. 9A is an illustration of a state of a sheet discharged from the fixing apparatus 1. In the longitudinal direction of the sheet, the sheet was discharged in such a state that the sheet curls into a cylindrical shape with the back surface located on an inner side. In FIG. 9A, the hatched surface is the back surface of the sheet. FIG. 9B is an illustration of a state in which first to third sheets which are successively discharged are discharged to the discharge portion 31. First, the sheet having curled into the cylindrical shape was discharged as the first sheet to the discharge portion 31. The second sheet was discharged to the discharge portion 31 while pushing out the first sheet. In the same manner, the third sheet pushed out the second sheet, and the second sheet pushed out the first sheet, with the result that the first sheet was dropped off from the discharge portion 31. In the second comparative example, it was impossible to stack the sheets.

Figure 10:
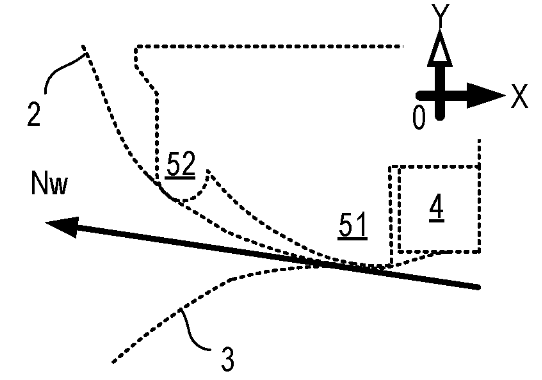
FIG. 10 shows evaluation results of a separating ability and a sheet stackability in the first embodiment.
Figure 10:
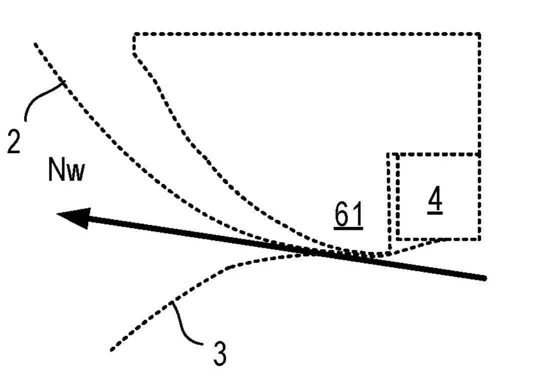
Figure 10:
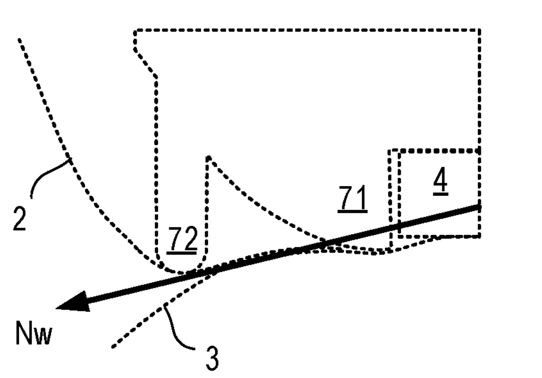
Figure 10:
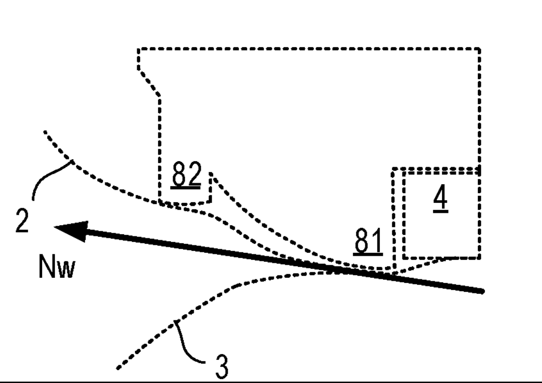

FIG. 10 shows a list of evaluation results for the separating ability to separate a sheet and the stackability of a discharged sheet in the first embodiment and the first to third comparative examples. FIG. 10 shows whether a sheet can be separated from the fixing film 2 by the fixing apparatus 1 as the separating ability and whether a sheet can be stacked on the discharge portion 31 as the stackability of a discharged sheet. Moreover, partial sectional views of the nip forming members on the downstream side in the conveyance direction and a discharge direction Nw of a sheet are shown. The discharge direction Nw of a sheet is a direction which can be determined based on a tangent at the nip portion on the downstream side in the conveyance direction at which the fixing film 2 and the pressure roller 3 are in contact with each other. That is, the discharge direction Nw is a tangential direction at an end portion of the fixing nip portion on the downstream side in the conveyance direction of a sheet.

In the first embodiment, the first comparative example, and the third comparative example, a sheet is discharged under a state in which the discharge direction Nw is inclined with a direction component toward the plus side in the Y-axis direction. The curve in the direction opposite to the direction in which a sheet curls due to heating is given to the sheet, and the sheet is discharged. Thus, it was possible to stack the sheet. Meanwhile, in the second comparative example, the second projection portion 72 projects more toward the minus side in the Y-axis direction than the first projection portion. Thus, the sheet is discharged under a state in which the discharge direction Nw of a sheet is inclined with a direction component toward the minus side in the Y-axis direction. Thus, the sheet curled, and it was impossible to stack the sheet. When the sheet is discharged such that the discharge direction Nw is inclined toward the plus side in the Y-axis direction, the sheet can be discharged in a curved state with the front surface located on the inner side. As a result, the curve in the direction opposite to the direction in which the sheet curls into the cylindrical shape due to heating can be given to the sheet. When the nip forming member 5 including the first projection portion and the second projection portion is mounted to the fixing apparatus 1, it was possible to stack the sheet at least by arranging the tip of the second projection portion more on the plus side in the Y-axis direction than the tip of the first projection portion. Based on these results, it could be confirmed that both the separating ability to separate a sheet and the stackability of a discharged sheet can be achieved with the configuration of the first embodiment.

As described above, according to the first embodiment, the radius of curvature at the tip part of the second projection portion 52 can be set to be smaller than the radius of the inner surface of the fixing film 2, and the tip of the second projection portion 52 can be arranged farther apart from the pressure roller 3 or the nip tangent W than the first projection portion 51. As a result, both the separating ability to separate a sheet and the stackability of a discharged sheet can be achieved. In the description above, the color laser beam printer is exemplified. However, regardless of monochrome or color, the fixing apparatus according to the first embodiment can be used, without any limitation, for the image forming apparatus 30 using the electrophotographic recording method.

As described above, according to the first embodiment, both the separating ability to separate a sheet and the stackability of a discharged sheet can be achieved.

Second Embodiment

Figure 11:
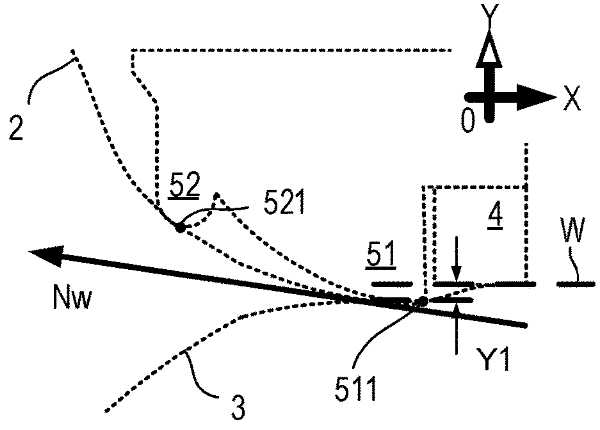
FIG. 11 shows evaluation results of a separating ability and a sheet stackability in a second embodiment.
Figure 11:
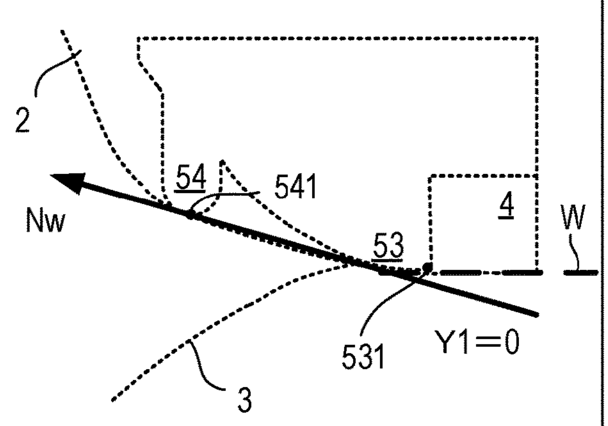

FIG. 11 shows evaluation results of a separating ability and a sheet stackability in a second embodiment. FIG. 11 shows evaluation results of a separating ability to separate a sheet and a stackability of a discharged sheet and partial sectional views of the nip forming member 5 on the downstream side in the conveyance direction in the first embodiment and the second embodiment. The nip forming member 5 of the second embodiment includes a first projection portion 53 and a second projection portion 54. The first projection portion 53 has a top point 531, and the second projection portion 54 has a top point 541.

The nip forming member 5 of the second embodiment is different from the first embodiment in that the first projection portion 53 is not allowed to enter over the nip tangent W so that Y1=0 is given. In both of the first embodiment and the second embodiment, it was possible to stack a sheet without any problem. According to the sectional views of FIG. 11, the discharge direction Nw of a sheet is more inclined toward the plus side in the Y-axis direction in the second embodiment. As the discharge direction Nw is inclined more toward the plus side in the Y-axis direction, a sheet can be discharged with the curve given to the sheet in a direction in which the front surface of the sheet forms a valley. That is, the ability to correct the sheet in the direction opposite to the direction in which the sheet curls into the cylindrical shape by heating is high. For example, in a case in which the process speed of the image forming apparatus 30 is high, and it is required to heat the sheet at high temperature, there is a tendency that the degree of curling of the sheet becomes larger. Therefore, the configuration of the second embodiment is more likely to improve the stackability of a sheet, and thus is preferred.

As described above, according to the second embodiment, both the separating ability to separate a sheet and the stackability of a discharged sheet can be achieved.

Third Embodiment

In a third embodiment, the fixing film 2, the pressure roller 3, and the like are the same as those of the first embodiment, and regulation members 9 configured to regulate a film shape are provided at end portions of the fixing film 2. With such a configuration, both the separating ability to separate a sheet and the stackability of a discharged sheet can be achieved. The fixing apparatus 1 according to the third embodiment includes a nip forming member 90, and the nip forming member 90 includes a first projection portion 91 and a second projection portion 92.

[Regulation Members]

Figure 12A:
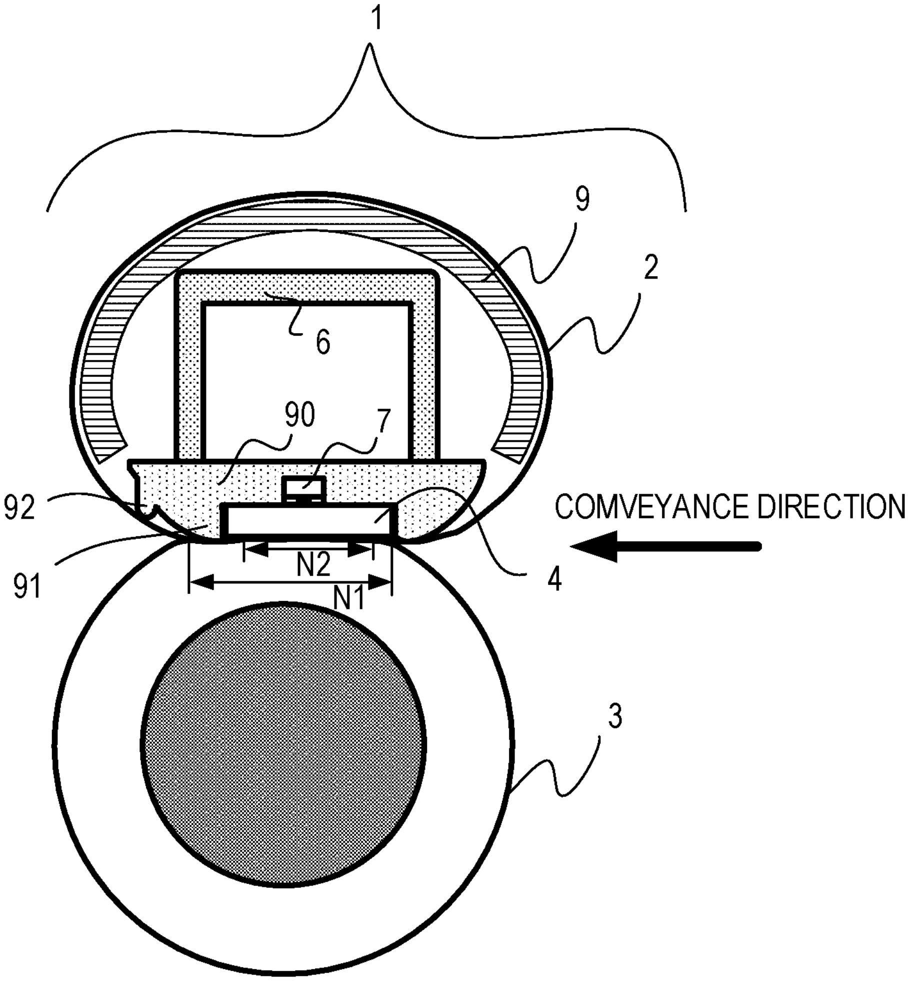
FIG. 12A is a sectional view of a fixing apparatus according to a third embodiment.
Figure 12B:
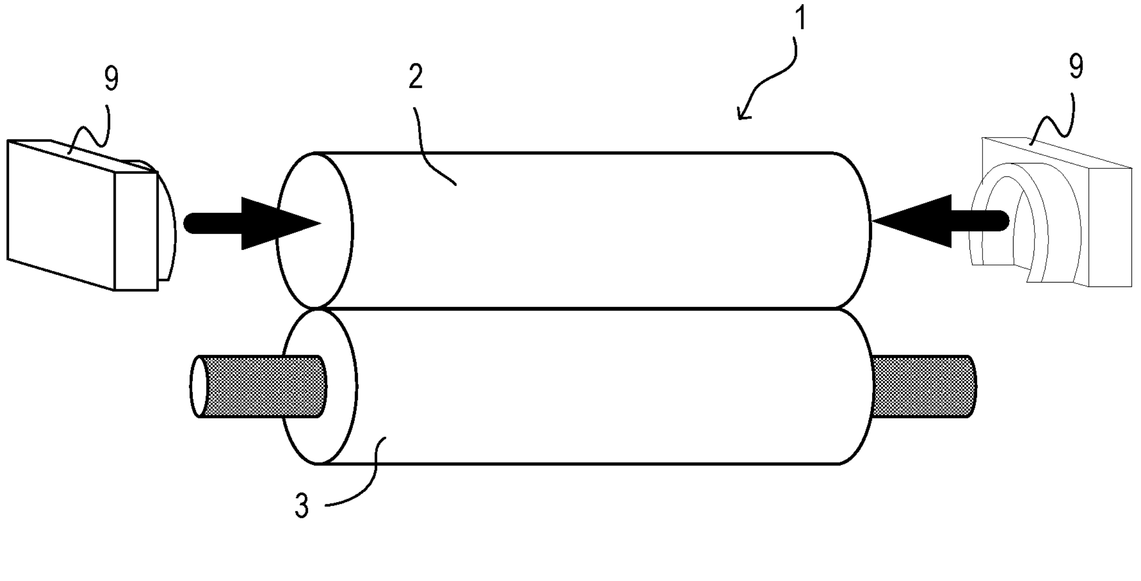
FIG. 12B is a perspective view of the fixing apparatus according to the third embodiment.

FIG. 12A is a sectional view of the fixing apparatus 1 according to the third embodiment. FIG. 12B is a perspective view of the fixing apparatus 1 according to the third embodiment. Unlike the fixing apparatus 1 according to the first embodiment, the regulation members 9 are arranged at a position in contact with the inner circumferential surface of the fixing film 2. The regulation members 9 are inserted into the fixing film 2 at both ends in the longitudinal direction of the fixing film 2, and are configured to support at least parts of both end portions of the fixing film 2. Through use of the regulation member 9, positions at the both ends of the fixing film 2 can be fixed, thereby stabilizing a rotational conveyance ability of the fixing film 2.

Figure 13A:
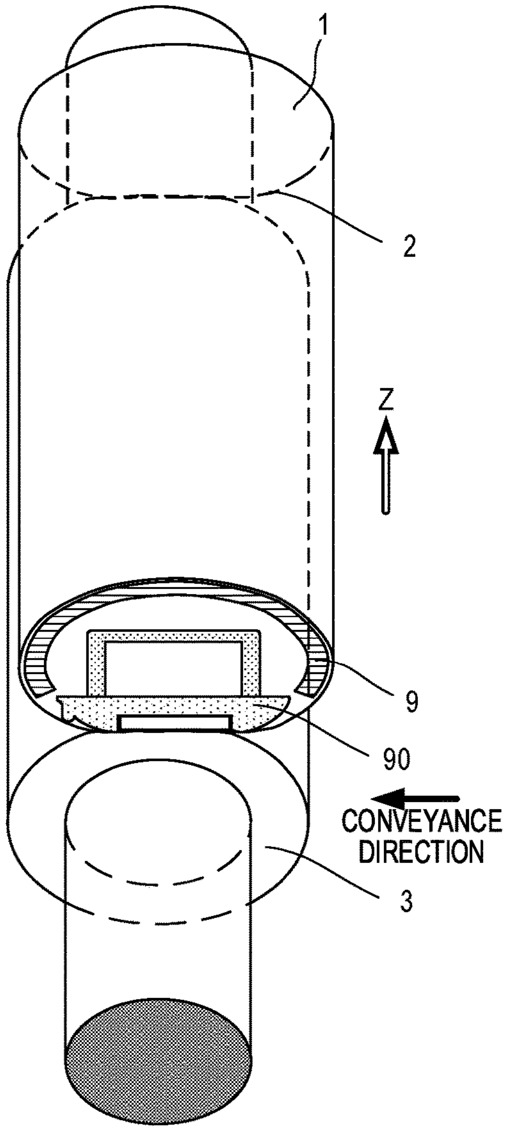
FIG. 13A and FIG. 13B are perspective views of the fixing apparatus according to the third embodiment.
Figure 13B:
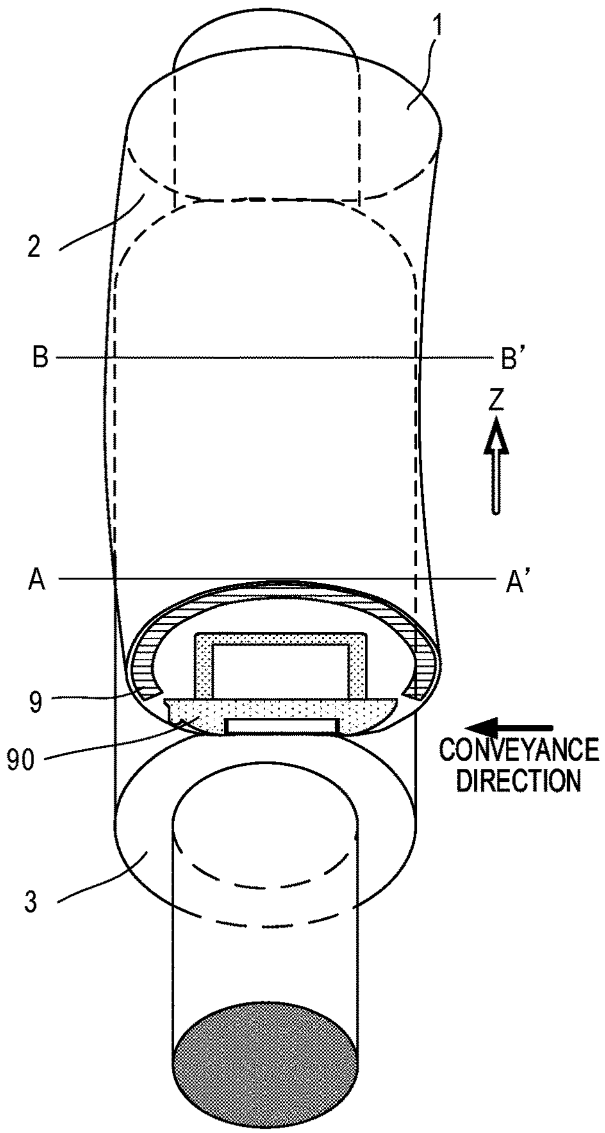

FIG. 13A is a perspective view of the fixing apparatus 1 when the pressure roller 3 is stopped (hereinafter referred to as "during stopping of the pressure roller 3"). FIG. 13B is a perspective view of the fixing apparatus 1 when the pressure roller 3 rotates (hereinafter referred to as "during rotation of the pressure roller 3"). A direction parallel to the longitudinal direction of the fixing film 2 (axial direction of the pressure roller 3) is referred to as a Z direction. In FIG. 13A, during stopping of the pressure roller 3, the fixing film 2 follows the pressure roller 3 without being curved, and is arranged parallel to the Z direction. In FIG. 13B, during rotation of the pressure roller 3, the fixing film 2 is curved, and is not parallel to the Z direction. The regulation members 9 regulate the film shape at the both end portions of the fixing film 2. Thus, during rotation of the pressure roller 3, the fixing film 2 exhibits, at the both end portions (in the vicinity of the A-A' part), substantially the same locus as a locus of the fixing film 2 exhibited during stopping of the pressure roller 3. Meanwhile, at a center portion in the longitudinal direction of the fixing film 2 (in the vicinity of the B-B' part), a member configured to regulate the fixing film 2 is not provided, and hence the fixing film 2 is pulled in the conveyance direction. Therefore, the fixing film 2 is curved in the conveyance direction at the center portion in the longitudinal direction.

[Nip Forming Member]

FIG. 14A is a plan view of the nip forming member 90. FIG. 14B is a sectional view of the nip forming member 90. FIG. 14C is a side view of the nip forming member 90. FIG. 14D is a sectional view of the nip forming member 90. In FIG. 14A and FIG. 14B, the second projection portion 92 is arranged more on the minus side in the X-axis direction at the center portion in the longitudinal direction (in the vicinity of the B-B' part) than the end portion in the longitudinal direction of the nip forming member 90 (in the vicinity of the A-A' part). That is, the second projection portion 92 is curved in an arch shape in such a manner as to separate away from a center axis extending in the longitudinal direction at the center portion in the longitudinal direction. In FIG. 14C and FIG. 14D, the second projection portion 92 is formed continuously in the Z-axis direction, and a length in the Y-axis direction is constant at any position in the Z-axis direction.

Figure 15A:
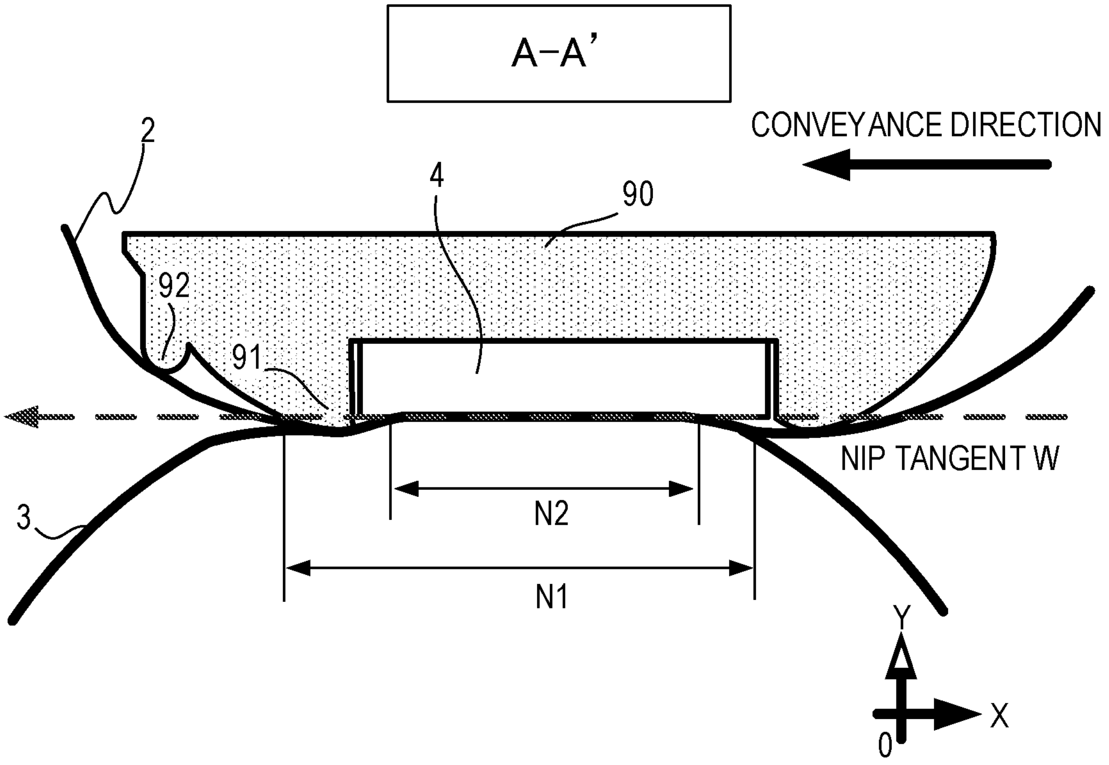
FIG. 15A is an A-A' sectional view of the nip forming member of the third embodiment.
Figure 15B:
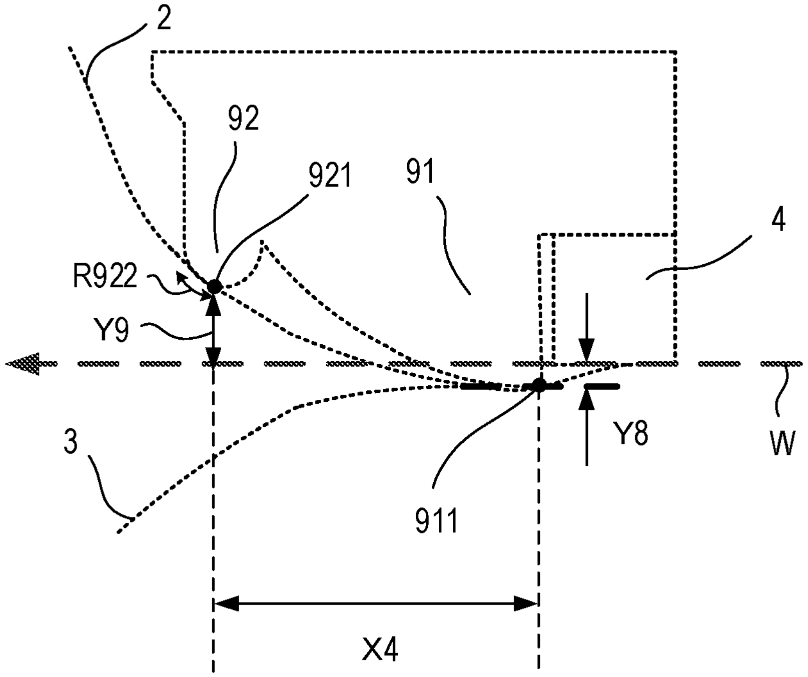
FIG. 15B is a partial enlarged view of FIG. 15A.

Next, details of the A-A' part of the end portion in the longitudinal direction of the nip forming member 90 and the B-B' part of the center portion in the longitudinal direction in the third embodiment are described. FIG. 15A is a sectional view of the nip forming member 90 at the A-A' part of the end portion in the longitudinal direction. In FIG. 15A, the nip forming member 90 includes the first projection portion 91 and the second projection portion 92. The nip area N1 has a length of about 8 mm in the conveyance direction, and the nip area N2 has a length of about 6 mm in the conveyance direction. FIG. 15B is a partial enlarged view of the nip forming member 90 including the first projection portion 91 and the second projection portion 92 on the downstream side of the nip forming member 90 in the conveyance direction. In FIG. 15B, the first projection portion 91 is arranged more on the plus side in the X-axis direction than the second projection portion 92, and a distance X4 between a top point 911 of the first projection portion 91 and a top point 921 of the second projection portion 92 is 3 mm. The first projection portion 91 crosses over the nip tangent W to enter the minus side in the Y direction, and an entry amount Y8 of the top point 911 of the first projection portion 91 is 0.2 mm. Meanwhile, the second projection portion 92 is arranged far apart without crossing the nip tangent W, and a minimum retreat amount Y9 from the top point 921 of the second projection portion 92 to the nip tangent W is 0.8 mm. The tip part of the second projection portion 92 has a semicircular sectional shape with a radius of 4 mm, and a radius of curvature R922 of an area that is in contact with the inner circumferential surface of the fixing film 2 is 4 mm.

Figure 16A:
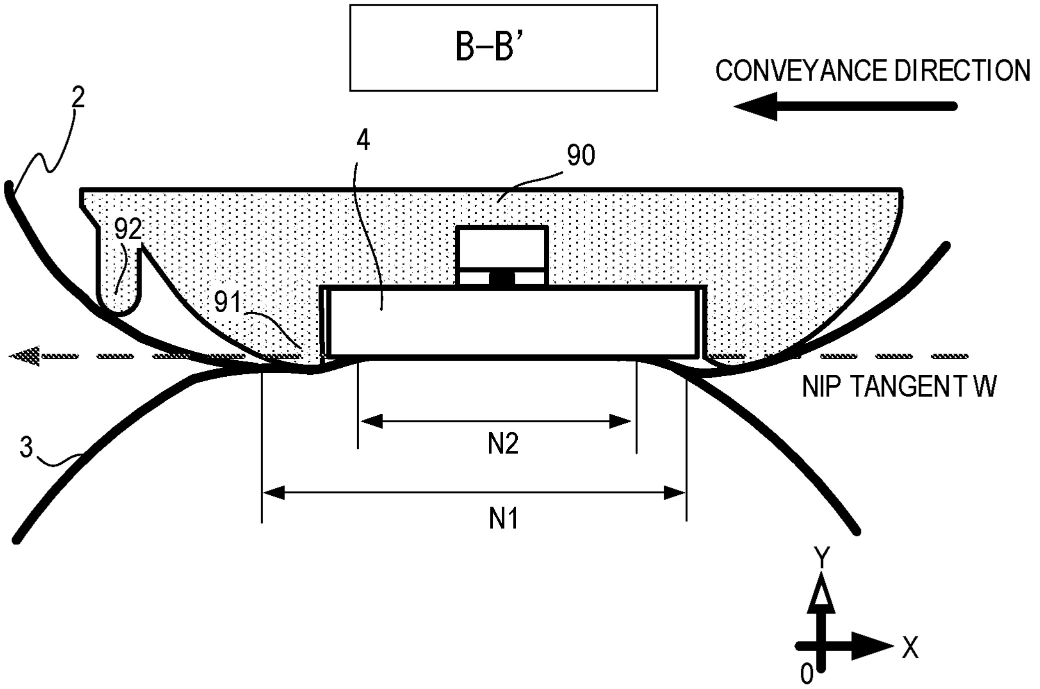
FIG. 16A is a B-B' sectional view of the nip forming member of the third embodiment.
Figure 16B:
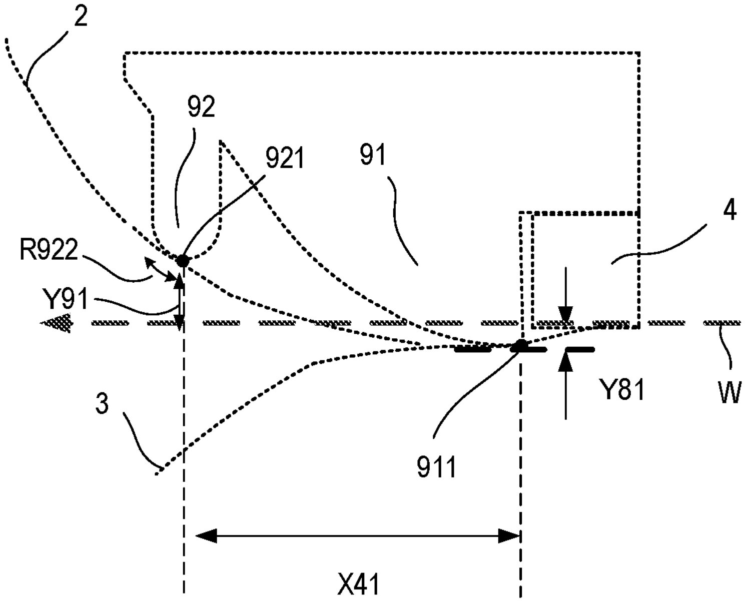
FIG. 16B is a partial enlarged view of FIG. 16A.

FIG. 16A is a sectional view of the nip forming member 90 at the B-B' part of the center portion in the longitudinal direction. In FIG. 16A, the nip forming member 90 includes the first projection portion 91 and the second projection portion 92. The nip area N1 has a length of about 8 mm in the conveyance direction, and the nip area N2 has a length of about 6 mm in the conveyance direction. FIG. 16B is a partial enlarged view of the nip forming member 90 including the first projection portion 91 and the second projection portion 92 on the downstream side of the nip forming member 90 in the conveyance direction. In FIG. 16B, the first projection portion 91 is arranged more on the plus side in the X-axis direction than the second projection portion 92, and a distance X41 between the top point 911 of the first projection portion 91 and the top point 921 of the second projection portion 92 is 4 mm. The distance X4 is 3 mm at the end portion in the longitudinal direction, whereas the distance X41 is 4 mm at the center portion in the longitudinal direction, that is, a position of the second projection portion 92 is apart by 1 mm on the minus side in the X-axis direction. The first projection portion 91 crosses over the nip tangent W to enter the minus side in the Y direction, and an entry amount Y81 of the top point 911 of the first projection portion 91 is 0.2 mm. Meanwhile, the second projection portion 92 is arranged far apart without crossing the nip tangent W, and a minimum retreat amount Y91 from the top point 921 of the second projection portion 92 to the nip tangent W is 0.8 mm. The tip part of the second projection portion 92 has a semicircular sectional shape with a radius of 4 mm, and the radius of curvature R922 of an area that is in contact with the inner circumferential surface of the fixing film 2 is 4 mm.

The second projection portion 92 at the center portion in the longitudinal direction is arranged more on the minus side in the X-axis direction than the second projection portion 92 at the end portion in the longitudinal direction by 1 mm so that the nip forming member 90 can be brought into contact with the fixing film 2 curved toward the outer side while following the fixing film 2. As a result, in any of areas corresponding to the end portion in the longitudinal direction and the center portion in the longitudinal direction, the second projection portion 92 can be brought into contact with the inner circumferential surface of the fixing film 2. As described above, with the nip forming member 90 of the third embodiment, at any of positions corresponding to the end portion and the center portion in the longitudinal direction, the inner circumferential surface of the fixing film 2 and the second projection portion 92 can be in contact with each other, thereby being capable of improving the separating ability to separate a sheet.

Effect

For the purpose of checking the effect of the third embodiment, the separating ability to separate a sheet in the case in which the nip forming member 90 of the third embodiment is mounted to the fixing apparatus 1 was checked. Test conditions are described below. A test room was set to a temperature of 30° C. and a humidity of 80%. An A4 sheet of CS-060F manufactured by Canon Inc. having a basis weight of 60 g/m$^2$ and a thickness of 81 μm was used as a first sheet. An A5 sheet of PBPAPER manufactured by Canon Inc. having a basis weight of 64 g/m$^2$ and a thickness of 83 μm was used as a second sheet. The power input to the fixing apparatus 1 was controlled such that the thermistor 7 provided in the fixing apparatus 1 keeps 220° C. The pressure roller 3 was rotated by a drive source (not shown), thereby conveying the first sheet and then the second sheet at 200 mm/sec. There were given leading and trailing edge margins of 5 mm and right and left margins of 5 mm. Toner of magenta with a density of 0.5 mg/cm$^2$ and toner of cyan with a density of 0.5 mg/cm$^2$ were superimposed and formed on the sheets.

When the nip forming member 90 of the third embodiment was used, it was possible to separate the first sheet (A4 sheet) and the second sheet (A5 sheet) from the fixing film 2. Moreover, when the stackability of a sheet was checked in the manner similar to the first embodiment, it was possible to stack the sheets without any problem. As described above, the sheets can easily be separated from the fixing film 2 regardless of the sheet width, and the sheet is corrected in the direction opposite to the direction in which the sheet curls due to heating so that the degree of curling of the sheet is alleviated, thereby being capable of improving the sheet stackability.

As described above, according to the third embodiment, both the separating ability to separate a sheet and the stackability of a discharged sheet can be achieved.

Fourth Embodiment

In a fourth embodiment, similarly to the third embodiment, the regulation members 9 configured to regulate the film shape are provided at the end portions of the fixing film 2. With the configuration of the fourth embodiment, both the separating ability to separate a sheet and the stackability of a discharged sheet can be achieved. The fixing apparatus 1 according to the fourth embodiment includes a nip forming member 100, and the nip forming member 100 includes a first projection portion 101 and a second projection portion 102. As mentioned above in the third embodiment, when the regulation members 9 are arranged, as illustrated in FIG. 13B, the fixing film 2 at the center portion in the longitudinal direction is pulled in the conveyance direction. As a result, the fixing film 2 is curved in the conveyance direction at the center portion in the longitudinal direction.

[Nip Forming Member]

Figure 17A:
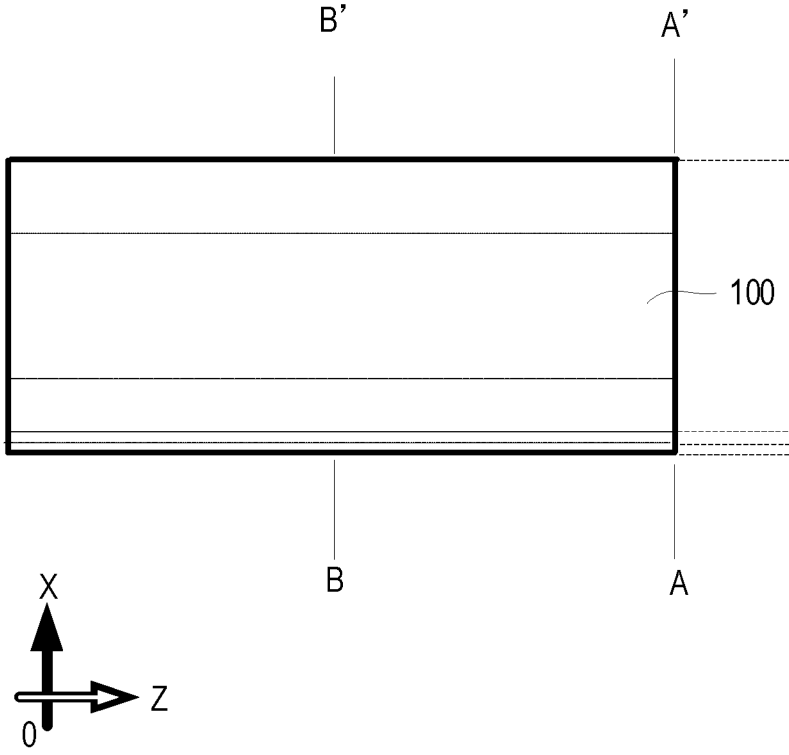
FIG. 17A, FIG. 17B, FIG. 17C, and FIG. 17D are schematic views of a nip forming member of a fourth embodiment.
Figure 17B:
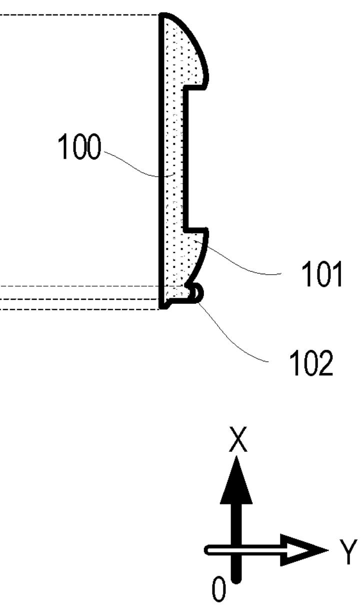
Figure 17C:
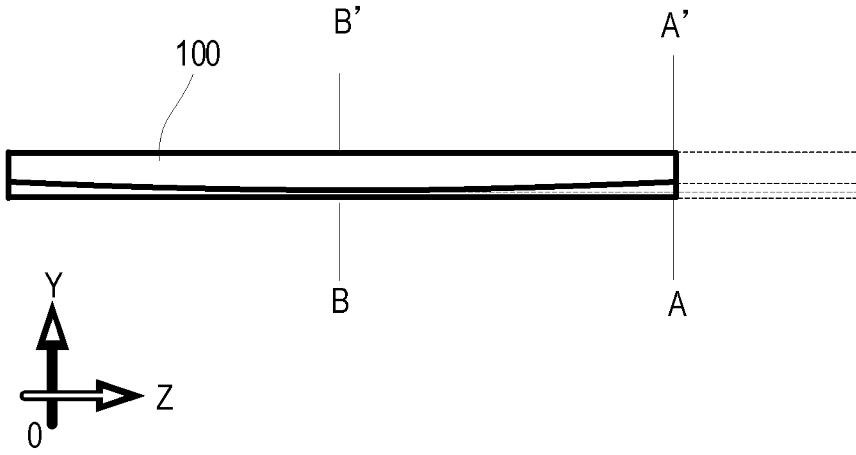
Figure 17D:
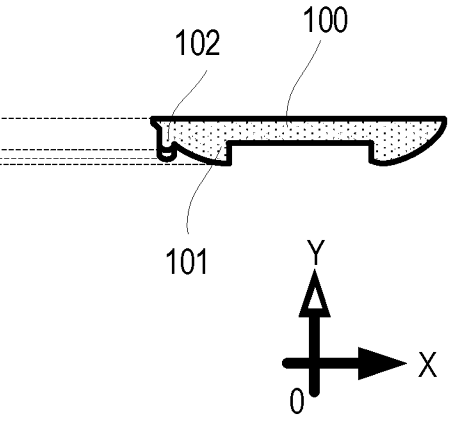

FIG. 17A is a plan view of the nip forming member 100. FIG. 17B is a sectional view of the nip forming member 100. FIG. 17C is a side view of the nip forming member 100. FIG. 17D is a sectional view of the nip forming member 100. In FIG. 17A and FIG. 17B, the second projection portion 102 has a constant length in the X-axis direction at the end portion in the longitudinal direction of the nip forming member 100 (in the vicinity of the A-A' part) and at the center portion in the longitudinal direction (in the vicinity of the B-B' part). In FIG. 17C and FIG. 17D, the second projection portion 102 extends and protrudes toward the minus side in the Y-axis direction more at the center portion in the longitudinal direction (in the vicinity of the B-B' part) than at the end portion in the longitudinal direction (in the vicinity of the A-A' part). The second projection portion 102 is formed continuously in the Z-axis direction.

Figure 18A:
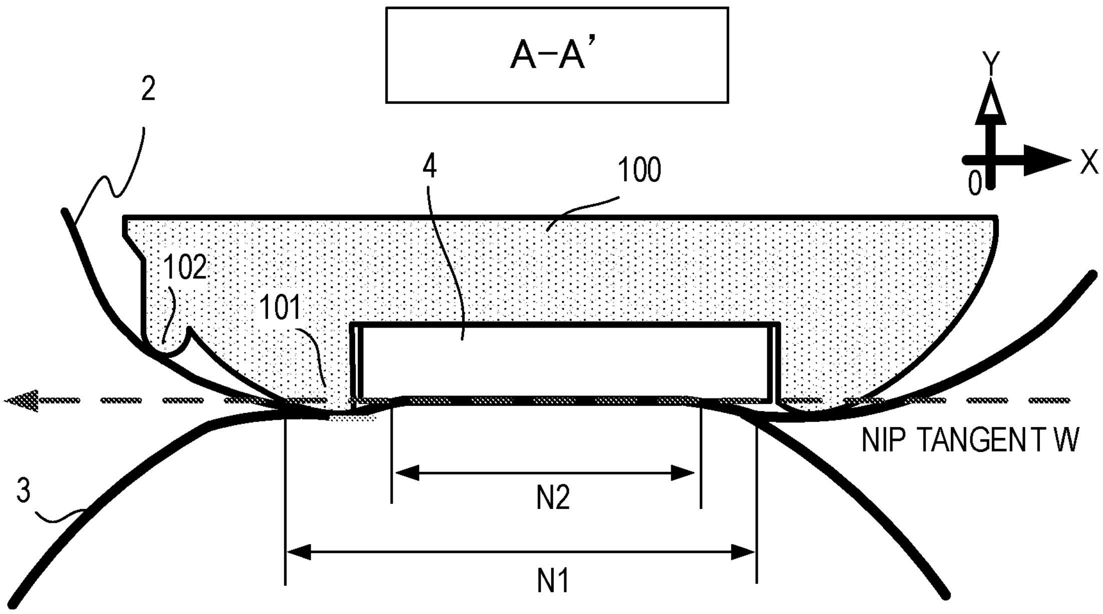
FIG. 18A is an A-A' sectional view of the nip forming member of the fourth embodiment.
Figure 18B:
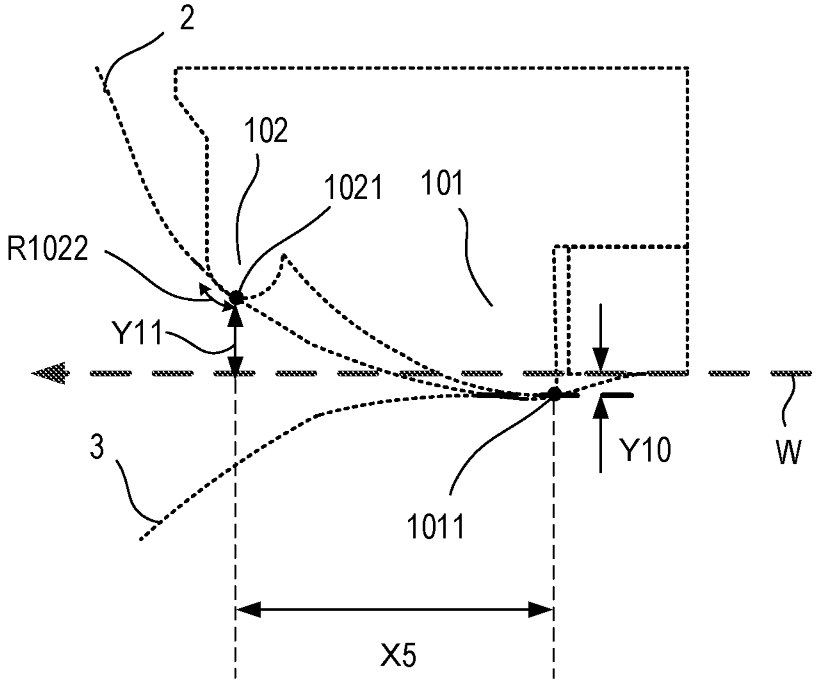
FIG. 18B is a partial enlarged view of FIG. 18A.

Next, details of the A-A' part of the end portion in the longitudinal direction of the nip forming member 100 and the B-B' part of the center portion in the longitudinal direction in the fourth embodiment are described. FIG. 18A is a sectional view of the nip forming member 100 at the A-A' part of the end portion in the longitudinal direction. In FIG. 18A, the nip forming member 100 includes the first projection portion 101 and the second projection portion 102. The nip area N1 has a length of about 8 mm in the conveyance direction, and the nip area N2 has a length of about 6 mm in the conveyance direction. In FIG. 18B, the first projection portion 101 is arranged more on the plus side in the X-axis direction than the second projection portion 102, and a distance X5 between a top point 1011 of the first projection portion 101 and a top point 1021 of the second projection portion 102 is 3 mm. The first projection portion 101 crosses over the nip tangent W to enter the minus side in the Y direction, and an entry amount Y10 of the top point 1011 of the first projection portion 101 is 0.2 mm. Meanwhile, the second projection portion 102 is arranged far apart without crossing the nip tangent W, and a minimum retreat amount Y11 from the top point 1021 of the second projection portion 102 to the nip tangent W is 0.8 mm. The tip part of the second projection portion 102 has a semicircular sectional shape with a radius of 4 mm, and a radius of curvature R1022 of an area that is in contact with the inner circumferential surface of the fixing film 2 is 4 mm.

Figure 19A:
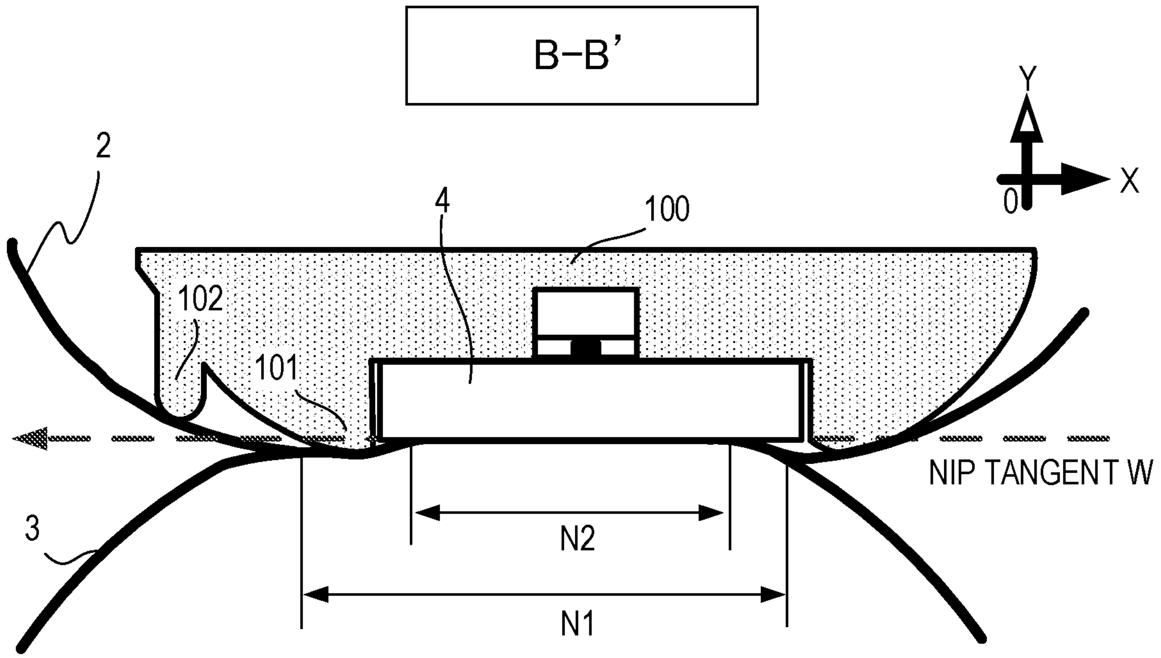
FIG. 19A is a B-B' sectional view of the nip forming member of the fourth embodiment.
Figure 19B:
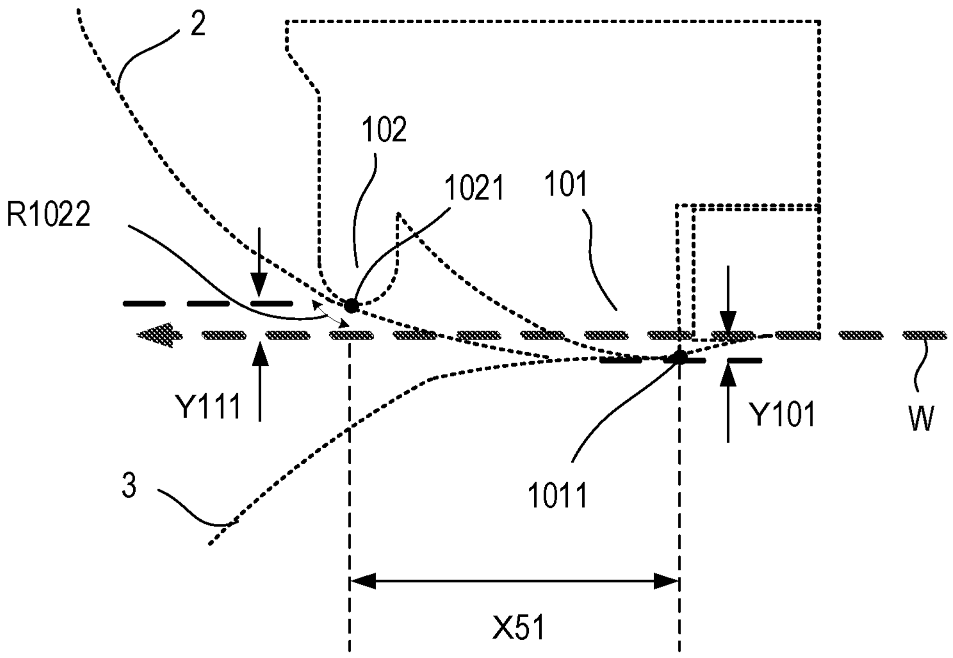
FIG. 19B is a partial enlarged view of FIG. 19A.

FIG. 19A is a sectional view of the nip forming member 100 at the B-B' part of the center portion in the longitudinal direction. In FIG. 19A, the nip forming member 100 includes the first projection portion 101 and the second projection portion 102. The nip area N1 has a length of about 8 mm in the conveyance direction, and the nip area N2 has a length of about 6 mm in the conveyance direction. In FIG. 19B, the first projection portion 101 is arranged more on the plus side in the X-axis direction than the second projection portion 102, and a distance X51 between the top point 1011 of the first projection portion 101 and the top point 1021 of the second projection portion 102 is 3 mm. The first projection portion 101 crosses over the nip tangent W to enter the minus side in the Y direction, and an entry amount Y101 of the top point 1011 of the first projection portion 101 is 0.2 mm. Meanwhile, the second projection portion 102 is arranged far apart without crossing the nip tangent W, and a minimum retreat amount Y111 from the top point 1021 of the second projection portion 102 to the nip tangent W is 0.2 mm. The tip part of the second projection portion 102 has a semicircular sectional shape with a radius of 4 mm, and the radius of curvature R1022 of an area that is in contact with the inner circumferential surface of the fixing film 2 is 4 mm.

The second projection portion 102 at the center portion in the longitudinal direction is arranged more on the minus side in the Y-axis direction than the second projection portion 102 at the end portion in the longitudinal direction by 0.6 mm so that the nip forming member 100 can be brought into contact with the fixing film 2 curved toward the outer side while following the fixing film 2. As a result, in any of areas corresponding to the end portion in the longitudinal direction and the center portion in the longitudinal direction, the second projection portion 102 can be brought into contact with the inner circumferential surface of the fixing film 2. As described above, according to the nip forming member 100 of the fourth embodiment, at any of positions corresponding to the end portion and the center portion in the longitudinal direction, the inner circumferential surface of the fixing film 2 and the second projection portion 102 can be in contact with each other, thereby being capable of improving the separating ability to separate a sheet.

Effect

For the purpose of checking the effect of the fourth embodiment, the separating ability to separate a sheet in the case in which the nip forming member 100 of the fourth embodiment is mounted to the fixing apparatus 1 was checked. Test conditions were the same as those in the third embodiment. When the nip forming member 100 of the fourth embodiment was used, it was possible to separate the first sheet (A4 sheet) and the second sheet (A5 sheet) from the fixing film 2. Moreover, when the stackability of a sheet was checked in the manner similar to the first embodiment, it was possible to stack the sheets without any problem. As described above, the sheets can easily be separated from the fixing film 2 regardless of the sheet width, and the sheet is corrected in the direction opposite to the direction in which the sheet curls due to heating so that the degree of curling of the sheet is alleviated, thereby being capable of improving the sheet stackability.

As described above, according to the fourth embodiment, both the separating ability to separate a sheet and the stackability of a discharged sheet can be achieved.

Fifth Embodiment

Figure 20A:
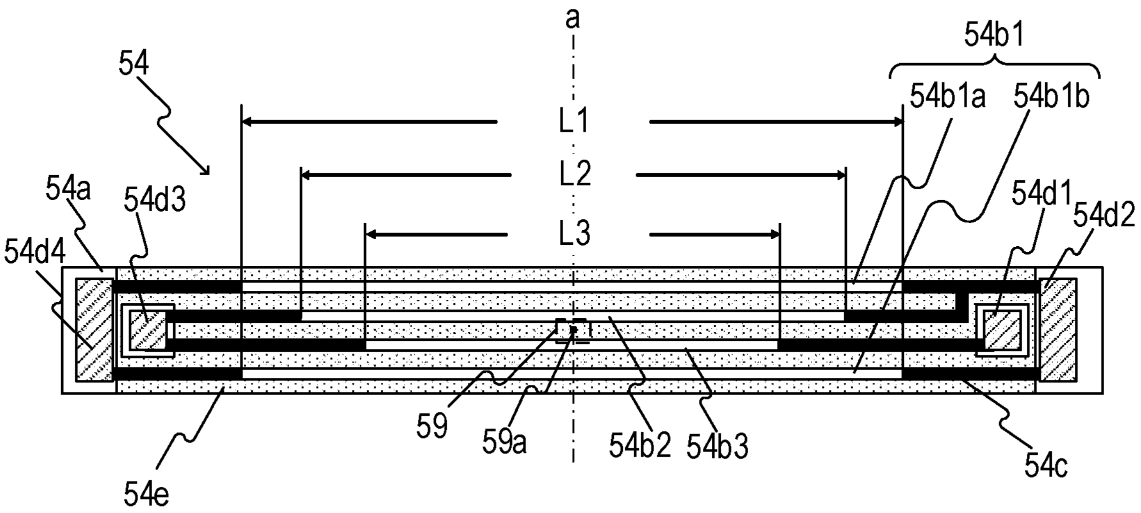
FIG. 20A and FIG. 20B are schematic views of a heater of a fifth embodiment.

A fifth embodiment is an embodiment of a case in which, in the first embodiment, a heater 54 including three heat generating elements having different lengths in the orthogonal direction with respect to the conveyance direction (width direction of a sheet) as illustrated in FIG. 20A is used. FIG. 20A is a schematic view of the heater of the fifth embodiment (heater 54 including three heat generating elements having different lengths). In the fifth embodiment, in areas in which the heat generating elements generate heat, an area through which a sheet does not pass is referred to as a non-sheet passing area (or a non-sheet passing portion), and an area through which the sheet passes is referred to as a sheet passing area (or a sheet passing portion).

The heater 54 is formed of a substrate 54*a*, a heat generating element 54*b*1*a* being a first heat generating element, a heat generating element 54*b*1*b* being a fourth heat generating element, a heat generating element 54*b*2 being a second heat generating element, a heat generating element 54*b*3 being a third heat generating element, a conductor 54*c*, contacts 54*d*1 to 54*d*4, and a protection glass layer 54*e*. In the following, the heat generating elements 54*b*1*a*, 54*b*1*b*, 54*b*2, and 54*b*3 are collectively referred to as heat generating elements 54*b* in some parts. Moreover, the heat generating elements 54*b*1*a* and 54*b*1*b* having substantially the same length in the longitudinal direction are collectively referred to as heat generating elements 54*b*1. The substrate 54*a* is made of alumina ($Al_2O_3$) being ceramics. The heat generating elements 54*b*1*a*, 54*b*1*b*, 54*b*2, and 54*b*3, the conductor 54*c*, and the contacts 54*d*1 to 54*d*4 are formed on the substrate 54*a*. Further, the protection glass layer 54*e* is formed thereon to secure insulation between the heat generating elements 54*b*1*a*, 54*b*1*b*, 54*b*2, and 54*b*3 and a film 51.

The heat generating elements 54*b* are different in length (hereinafter also referred to as size) in the longitudinal direction. The heat generating elements 54*b*1*a* and 54*b*1*b* each have a length of L1=222 mm, which is a first length, in the longitudinal direction. The heat generating element 54*b*2 has a length of L2=188 mm, which is a second length, in the longitudinal direction. The heat generating element 54*b*3 has a length of L3=154 mm, which is a third length, in the longitudinal direction. The lengths L1, L2, and L3 have a relationship of L1>L2>L3.

Moreover, the largest sheet width (hereinafter referred to as a maximum sheet width) in a sheet which can be used in the image forming apparatus 30 according to the fifth embodiment is 216 mm, and the smallest sheet width (hereinafter referred to as a minimum sheet width) is 76 mm. Thus, the first length L1 is set to such a length that an image size (206 mm) having the maximum sheet width (216 mm) can be fixed by the heat generating elements 54*b*1. The heat generating elements 54*b*1 are electrically connected to the contact 54*d*2 being a second contact and the contact 54*d*4 being a fourth contact through intermediation of the conductor 54*c*, and the heat generating element 54*b*2 is electrically connected to the contacts 54*d*2 and 54*d*3 through intermediation of the conductor 54*c*. The heat generating element 54*b*3 is electrically connected to the contact 54*d*1 being a first contact and the contact 54*d*3 being a third contact through intermediation of the conductor 54*c*. Here, the heat generating element 54*b*1*a* and the heat generating element 54*b*1*b* have the same lengths and are always used substantially at the same time. The heat generating element 54*b*1*a* is provided at one end portion in a widthwise direction of the substrate 54*a*, and the heat generating element 54*b*1*b* is provided at another end portion in the widthwise direction of the substrate 54*a*. The heat generating elements 54*b*2 and 54*b*3 are provided between the heat generating element 54*b*1*a* and the heat generating element 54*b*2*b* in the widthwise direction of the substrate 54*a* in such a manner as to be symmetrical with respect to a center in the widthwise direction.

Figure 20B:
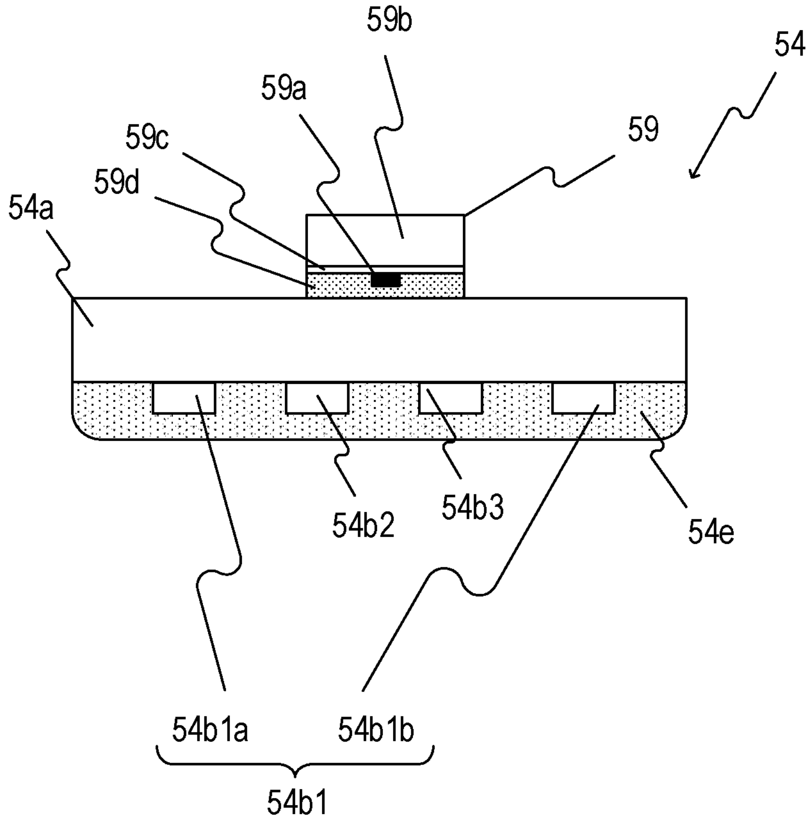

A fixing temperature sensor 59 being a temperature detecting unit is a thermistor. A configuration of the fixing temperature sensor 59 is described with reference to FIG. 20B. The fixing temperature sensor 59 illustrated in FIG. 20B is formed of a main thermistor element 59*a*, a holder 59*b*, a ceramic paper 59*c*, and an insulation resin sheet 59*d*. The ceramic paper 59*c* has a role of hindering heat conduction between the holder 59*b* and the main thermistor element 59*a*. The insulation resin sheet 59*d* has a role of physically and electrically protecting the main thermistor element 59*a*. The main thermistor element 59*a* is a temperature detecting unit having an output value that is changed in accordance with the temperature of the heater 54, and is connected to a CPU (not shown) of the image forming apparatus 30 through a Dumet wire (not shown) and wiring. The main thermistor element 59*a* detects the temperature of the heater 54 and outputs a detection result to the CPU.

The fixing temperature sensor 59 is located on a surface opposite to the protection glass layer 54*e* over the substrate 54*a*. Further, the fixing temperature sensor 59 is installed in contact with the substrate 54*a* at a position on a reference line "a" (position corresponding to the center) in the longitudinal direction of the heat generating element 54*b*. The CPU is configured to control the temperature at the time of fixing processing based on the detection result of the fixing temperature sensor 59. The above is the description as to the configuration of the fixing temperature sensor 59 being a main thermistor.

With the heater 54 described above, even when a width of a sheet is smaller than the length of the heater 54 in the longitudinal direction, through reduction of a power ratio of the heat generating element 54*b*1, an increase in temperature of the non-sheet passing portion is suppressed, thereby being capable of preventing both ends of a sheet from being high in temperature. Moreover, the force of causing the sheet to curl into the cylindrical shape can be alleviated. Therefore, also with regard to the sheet stackability, even when conditions of sheet passage and the like change, a fixing apparatus which allows such change can be provided. The power ratio mentioned here is a ratio of power supplied to the heat generating element 54*b*1 over the entire width with respect to the power supplied to the heat generating element 54*b*2 or the heat generating element 54*b*3.

As described above, according to the fifth embodiment, the temperature difference between the sheet passing portion and the non-sheet passing portion at the fixing nip portion is reduced, thereby being capable of achieving both the sheet separating ability and the sheet stackability having high permissiveness.

According to the embodiments of the invention, both the separating ability to separate a sheet and the stackability of a discharged sheet can be achieved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-162957, filed Sep. 6, 2019, which is hereby incorporated by reference herein in its entirety.

What is claimed is:

1. A fixing apparatus comprising:

a tubular fixing film;

a pressure roller configured to urge the fixing film;

a nip forming member, which is arranged in an internal space of the fixing film, and is configured to form a nip portion between the fixing film and the pressure roller; and a heater, which is arranged in the internal space of the fixing film, held by the nip forming member, and is configured to heat, in the nip portion, a toner image on a recording material conveyed from an image forming portion, wherein the nip forming member includes:

a first projection portion configured to protrude toward the pressure roller in a height direction perpendicular to a conveyance direction of the recording material and a longitudinal direction of the nip forming member, the first projection portion being located on an inner side of the nip portion and on a downstream side of the heater in a conveyance direction of the recording material, and configured to extend along the longitudinal direction and abut against an inner circumferential surface of the fixing film, wherein the first projection portion is disposed to cross a nip tangent of the nip portion in the height direction at a center portion and an end portion of the nip forming portion in the longitudinal direction; and a second projection portion configured to protrude toward the pressure roller in the height direction, the second projection portion being located on an outer side of the nip portion and on the downstream side of the heater in the conveyance direction, and configured to extend along the longitudinal direction and abut against the inner circumferential surface of the fixing film, wherein the second projection portion is disposed to be curved toward the pressure roller without crossing the nip tangent in the height direction at the center portion and the end portion of the nip forming member in the longitudinal direction, wherein a distance in the height direction between a top point at the end portion of the second projection portion and the nip tangent at the center portion is larger than a distance in the height direction between a top point at the end portion of the first projection portion and the nip tangent.

2. The fixing apparatus according to claim 1, wherein the second projection portion is formed continuously in the longitudinal direction.

3. The fixing apparatus according to claim 1, wherein the top point of the second projection portion has a semicircular shape.

4. The fixing apparatus according to claim 1, further comprising a regulation member, which is inserted into an end portion of the fixing film in the longitudinal direction, and is configured to regulate a position of the fixing film.

5. An image forming apparatus comprising:

an image forming unit configured to form a toner image on a recording material; and a fixing apparatus according to claim 1, the fixing apparatus being configured to fix the toner image formed by the image forming unit to the recording material.

* * * * *